(12) United States Patent
Beckwith et al.

(10) Patent No.: US 7,219,362 B2
(45) Date of Patent: May 15, 2007

(54) PACKAGING FOR LIMITED LIFETIME OPTICAL DATA STORAGE MEDIA

(75) Inventors: Scott W. Beckwith, Greer, SC (US); Brian L. Butler, Taylors, SC (US); Ronald L. Cotterman, Greenville, SC (US); Frank B. Edwards, Simpsonville, SC (US); Thomas D. Kennedy, Summerville, SC (US); Janet W. Rivett, Simpsonville, SC (US); Drew V. Speer, Simpsonville, SC (US)

(73) Assignee: Cryovac, Inc., Duncan, SC (US)

( * ) Notice: Subject to any disclaimer, the term of this patent is extended or adjusted under 35 U.S.C. 154(b) by 559 days.

(21) Appl. No.: 10/429,364

(22) Filed: May 5, 2003

(65) Prior Publication Data

US 2004/0008613 A1    Jan. 15, 2004

Related U.S. Application Data

(60) Provisional application No. 60/395,375, filed on Jul. 12, 2002.

(51) Int. Cl.
G11B 23/03      (2006.01)
B65D 85/30      (2006.01)

(52) U.S. Cl. .................... 720/736; 206/308.2
(58) Field of Classification Search ............ 369/291, 369/291.1; 720/718, 719, 736; 206/308.1, 206/308.2, 308.3
See application file for complete search history.

(56) References Cited

U.S. PATENT DOCUMENTS

| | | | |
|---|---|---|---|
| 5,211,875 A | 5/1993 | Speer et al. | |
| 5,310,497 A | 5/1994 | Ve Speer et al. | |
| 5,316,949 A | 5/1994 | Bull et al. | |
| 5,350,622 A | 9/1994 | Speer et al. | |
| 5,399,289 A | 3/1995 | Speer et al. | |
| 5,483,819 A * | 1/1996 | Barmore et al. | 73/38 |
| 5,815,484 A | 9/1998 | Smith et al. | |
| 5,896,994 A * | 4/1999 | Krebs | 206/524.4 |
| 5,942,297 A | 8/1999 | Speer et al. | |
| 6,011,772 A | 1/2000 | Rollhaus et al. | |
| 6,071,626 A | 6/2000 | Frisk | |

(Continued)

FOREIGN PATENT DOCUMENTS

JP    11334783    12/1999

(Continued)

*Primary Examiner*—Allen Cao
(74) *Attorney, Agent, or Firm*—Mark B. Quatt

(57) ABSTRACT

A package includes a thermoformed web or support member, an optical data storage medium disposed in a cavity of the thermoformed web, or on the support member; and a covering web disposed on the optical data storage medium, and on the thermoformed web or support member, and in sealing relationship to the thermoformed web or support member; where each of the thermoformed web or support member, and the covering web, includes an oxygen barrier; and where at least one of the thermoformed web or support member, and the covering web, includes an oxygen scavenger. Methods of making the package are also disclosed. In addition to, or alternatively to including the oxygen scavenger in at least one of the thermoformed or support member, and the covering web, the oxygen scavenger can be disposed on the optical medium, e.g. in the form of a disc, coating, label, pellet, wafer, or flattened sachet.

15 Claims, 12 Drawing Sheets

U.S. PATENT DOCUMENTS

| | | |
|---|---|---|
| 6,338,933 B1 | 1/2002 | Lawandy et al. |
| 6,343,063 B1 | 1/2002 | Rollhaus et al. |
| 6,523,683 B1 * | 2/2003 | Fraser et al. .............. 206/308.1 |
| 6,678,239 B2 * | 1/2004 | Clemens ..................... 720/736 |
| 7,020,663 B2 * | 3/2006 | Hay et al. ................. 707/104.1 |
| 2002/0162758 A1 | 11/2002 | Clemens |
| 2003/0213710 A1 * | 11/2003 | Thompson et al. ...... 206/308.1 |
| 2004/0029266 A1 * | 2/2004 | Barbera-Guillem ...... 435/297.5 |
| 2004/0043254 A1 | 3/2004 | Widnudel et al. |
| 2004/0152013 A1 | 8/2004 | Olson et al. |
| 2004/0185155 A1 * | 9/2004 | Garwood .................... 426/392 |
| 2005/0145512 A1 * | 7/2005 | Compton et al. ........ 206/308.1 |

FOREIGN PATENT DOCUMENTS

| | | |
|---|---|---|
| WO | WO 99/10251 | 3/1999 |
| WO | WO 99/54133 | 10/1999 |

* cited by examiner

PACKAGING FOR LIMITED LIFETIME OPTICAL DATA STORAGE MEDIA

This application claims the benefit of U.S. Provisional Application No. 60/395,375, filed Jul. 12, 2002.

FIELD OF THE INVENTION

The present invention relates to packaging for limited lifetime optical data storage media.

BACKGROUND OF THE INVENTION

Optical data storage media such as CD's (Compact Discs), DVD's (Digital Video Discs or Digital Variety Discs), DVD-ROM, and CDROM's are used to distribute software, games, movies, and the like. Limited lifetime versions have been developed, e.g. by Flex-play Technologies, Inc. and Spectra-Disc, that are playable for a limited amount of time, e.g. between 15 and 48 hours. Examples of this technology are disclosed in U.S. Pat. No. 5,815,484 (Smith et al.), U.S. Pat. No. 6,338,933 (Lawandy et al.), U.S. Pat. No. 6,343,063 (Rollhaus et al.), and U.S. Pat. No. 6,011,772 (Rollhaus et al.), all incorporated herein by reference in their entirety. These technologies would allow for example, point-of-purchase of movies that would not have to be returned, because after a limited time the disc will no longer play, i.e. become inactive.

One method to make limited lifetime discs is to incorporate a layer within them that contains a dye in a transparent reduced (leuco) form. Upon exposure to oxygen for a period of time, e.g. oxygen from air, the leuco dye oxidizes and becomes optically colored or darkened. This chemical reaction and resulting color change effectively blocks the interrogating laser beam used to read the data. This can be incorporated for example into various DVD formats including DVD-5, DVD-9, DVD-18 and the like. Other technologies achieve limited play life by incorporating chemistry that causes, in the presence of oxygen, the reflective metallic coating to oxidize or corrode. The oxidized or corroded metallic coating can not then accurately reflect the interrogating laser beam used to read the data.

A shelf life of between 6 and 12 months is highly desirable for such oxygen-sensitive optical discs. Unfortunately, even in a rigorously gas flushed and/or vacuum high barrier package sufficient oxygen is often present to oxidize the dye used to block the laser beam. The oxygen may be dissolved in the polycarbonate (PC) disc and/or trapped in the small headspace in the package. Because of the thickness and OTR (oxygen transmission rate) of typical optical discs, it requires about 24 hours to de-oxygenate the PC by inert gas flushing, which is an impractical packaging scenario. A failure to control and limit the presence of oxygen will result in premature disabling of the optical disc. While polycarbonate is currently the material of choice in the manufacture of optical discs, dissolved oxygen and oxygen diffusion issues would also be present in any other polymer that may be used to manufacture optical discs. Polymers that may be selected for optical disc manufacture include acrylic polymers and copolymers, polyamides, polymethylpentene, ethylene/norbornene copolymers, polyesters, and styrenic polymers.

In order to have reasonable shelf life through distribution, these limited lifetime discs can benefit greatly from oxygen scavenging packaging.

One form of oxygen scavenging packaging is oxygen scavenging sachets. These could be used in a MAP (modified atmosphere) package, but unfortunately can be costly, and aesthetically difficult to accommodate in a package containing a typically thin optical data storage medium such as a CD or DVD.

It has now been found that a primary vacuum or MAP (modified atmosphere) package in the form of a thermoformed package, that additionally incorporates an oxygen scavenger in either or both of a thermoformed (preferably bottom) web and a covering (preferably non-formed and preferably top) web, can prevent premature disabling or inactivation of an optical data storage medium before the intended lifetime of the medium is reached. Since the preferred package format is a vacuum package, an oxygen scavenger relatively uniformly dispersed in the film is preferred over sachets and the like. This is because, in a tight vacuum package, a sachet tends to provide oxygen scavenging activity that is physically localized and therefore functionally limited to its position in the package. In contrast, an oxygen scavenging film which physically forms at least a portion of the primary packaging material, e.g. as a continuous or semi-continuous layer or coating, will effectively scavenge oxygen in whatever portion of the package the scavenger is present.

The inventors have found that a package of the type described above can incorporate an oxygen scavenger in the form of a layer or coating, preferably along with at least one of several other useful features. These include means for opening the package, a means for identifying the package (authentication), an anti-theft feature, a means of tracking and/or inventory management, and printing (graphics).

SUMMARY OF THE INVENTION

In a first aspect, a package comprises a thermoformed web having a cavity therein; an optical data storage medium disposed in the cavity of the thermoformed web; and a covering web disposed on the optical data storage medium, and on the thermoformed web, and in sealing relationship to the thermoformed web; wherein each of the thermoformed web and the covering web comprises an oxygen barrier material; and wherein at least one of the thermoformed web and the covering web comprises an oxygen scavenger.

In a second aspect, a package comprises a thermoformed thermoplastic web having a cavity therein; an optical data storage medium disposed in the cavity of the thermoformed thermoplastic web; and a covering non-formed thermoplastic web disposed on the optical data storage medium, and on the thermoformed thermoplastic web, such that the thermoformed thermoplastic web and the covering non-formed thermoplastic web are in congruent relationship along a perimeter of the package, and wherein a perimeter seal joins the thermoformed thermoplastic web and the covering non-formed thermoplastic web along the perimeter of the package; wherein each of the thermoformed web and the covering web comprises an oxygen barrier material; and wherein at least one of the thermoformed web and the covering web comprises an oxygen scavenger.

In a third aspect, a package comprises a support member having a first surface and a second surface; an optical data storage medium disposed on the first surface of the support member; and a covering web disposed on the optical data storage medium; wherein the covering web is draped over the optical data storage medium such that the covering web substantially conforms to the shape of the optical data storage medium; wherein the covering web is sealed to the first surface of the support member to form a seal at a location outside the periphery of the optical data storage medium; wherein each of the support member and the covering web comprises an oxygen barrier material; and wherein at least one of the support member and the covering web comprises an oxygen scavenger.

In a fourth aspect, a package comprises a thermoformed web having a cavity therein; an optical data storage medium disposed in the cavity of the thermoformed web; a covering web disposed on the optical data storage medium, and on the thermoformed web, and in sealing relationship to the thermoformed web; and an oxygen scavenger disposed on at least a portion of the optical data storage medium; wherein each of the thermoformed web and the covering web comprises an oxygen barrier material.

In a fifth aspect, a package comprises a thermoformed thermoplastic web having a cavity therein; an optical data storage medium disposed in the cavity of the thermoformed thermoplastic web; a covering non-formed thermoplastic web disposed on the optical data storage medium, and on the thermoformed thermoplastic web, such that the thermoformed thermoplastic web and the covering non-formed thermoplastic web are in congruent relationship along a perimeter of the package, and wherein a perimeter seal joins the thermoformed thermoplastic web and the covering non-formed thermoplastic web along the perimeter of the package; and an oxygen scavenger disposed on at least a portion of the optical data storage medium; wherein each of the thermoformed web and the covering web comprises an oxygen barrier material.

In an sixth aspect, a package comprises a support member having a first surface and a second surface; an optical data storage medium disposed on the first surface of the support member; a covering web disposed on the optical data storage medium; and an oxygen scavenger disposed on at least a portion of the optical data storage medium; wherein the covering web is draped over the optical data storage medium such that the covering web substantially conforms to the shape of the optical data storage medium; wherein the covering web is sealed to the first surface of the support member to form a seal at a location outside the periphery of the optical data storage medium; and wherein each of the support member and the covering web comprises an oxygen barrier material.

In a seventh aspect, a method of making a package comprises providing a thermoformable web; providing an optical data storage medium; providing a covering web; thermoforming the thermoformable web to provide a cavity; placing the optical data storage medium in the thermoformed cavity; covering the optical data storage medium and the thermoformable web with the covering web; and sealing the covering web to the thermoformed web; wherein each of the thermoformable web and the covering web comprises an oxygen barrier material; and wherein at least one of the thermoformable web and the covering web comprises an oxygen scavenger.

In an eighth aspect, a method of making a package comprises providing a thermoformable thermoplastic web; providing an optical data storage medium; providing a covering non-formed thermoplastic web; thermoforming the thermoformable thermoplastic web to provide a cavity; placing the optical data storage medium in the thermoformed cavity; covering the optical data storage medium and the thermoformed web with the covering web; and sealing the covering non-formed thermoplastic web to the thermoformed web such that the thermoformed thermoplastic web and the covering non-formed thermoplastic web are in congruent relationship along a perimeter of the package, and wherein a perimeter seal joins the thermoformed thermoplastic web and the covering non-formed thermoplastic web along the perimeter of the package; wherein each of the thermoformable web and the covering web comprises an oxygen barrier material; and wherein at least one of the thermoformable web and the covering web comprises an oxygen scavenger.

In a ninth aspect, a method of making a package comprises providing a support member having a first surface and a second surface; providing an optical data storage medium; providing a covering web; placing the optical data storage medium on the first surface of the support member; heating the covering web; draping the covering web over the optical data storage medium such that the covering web substantially conforms to the shape of the optical data storage medium; and sealing the covering web to the first surface of the support member to form a seal at a location outside the periphery of the optical data storage medium; wherein each of the support member and the covering web comprises an oxygen barrier material; and wherein at least one of the support member and the covering web comprises an oxygen scavenger.

In these seventh, eighth, and ninth aspects, between the step of placing the optical data storage medium in the thermoformed cavity or on the first surface of the support member, and the step of sealing the covering web to the thermoformed web or to the first surface of the support member, the package can optionally be vacuumized, or gas flushed, or vacuumized and then gas flushed, or vacuumized, gas flushed, and revacuumized.

In a tenth aspect, a method of making a package comprises providing a thermoformable web; providing an optical data storage medium; providing a covering web; providing an oxygen scavenger; thermoforming the thermoformable web to provide a cavity; placing the optical data storage medium in the thermoformed cavity; disposing the oxygen scavenger on at least a portion of the optical data storage medium; covering the optical data storage medium and the thermoformable web with the covering web; and sealing the covering web to the thermoformable web; wherein each of the thermoformable web and the covering web comprises an oxygen barrier material.

In an eleventh aspect, a method of making a package comprises providing a thermoformable thermoplastic web; providing an optical data storage medium; providing a covering non-formed thermoplastic web; providing an oxygen scavenger; thermoforming the thermoformable thermoplastic web to provide a cavity; placing the optical data storage medium in the thermoformed cavity; disposing the oxygen scavenger on at least a portion of the optical data storage medium; covering the optical data storage medium and the thermoformed web with the covering web; and sealing the covering non-formed thermoplastic web to the thermoformed web such that the thermoformed thermoplastic web and the covering non-formed thermoplastic web are in congruent relationship along a perimeter of the package, and wherein a perimeter seal joins the thermoformed thermoplastic web and the covering non-formed thermoplastic web along the perimeter of the package; wherein each of the thermoformable web and the covering web comprises an oxygen barrier material.

In an twelfth aspect, a method of making a package comprises providing a support member having a first surface and a second surface; providing an optical data storage medium; providing a covering web; providing an oxygen scavenger; placing the optical data storage medium on the first surface of the support member; disposing the oxygen scavenger on at least a portion of the optical data storage medium; heating the covering web; draping the covering web over the optical data storage medium and the oxygen scavenger such that the covering web substantially conforms to the shape of the optical data storage medium; and sealing the covering web to the first surface of the support member to form a seal at a location outside the periphery of the optical data storage medium; wherein each of the support member and the covering web comprises an oxygen barrier material; and wherein at least one of the support member and the covering web comprises an oxygen scavenger.

In these tenth, eleventh, and twelfth aspects, between the step of disposing the oxygen scavenger on at least a portion of the optical data storage medium, and the step of sealing the covering web to the thermoformed web or to the first surface of the support member, the package can optionally be vacuumized, or gas flushed, or vacuumized and then gas flushed, or vacuumized, gas flushed, and revacuumized.

BRIEF DESCRIPTION OF THE DRAWINGS

A detailed description of preferred embodiments of the invention follows, with reference to the attached drawings, wherein.

DEFINITIONS

Figure 1:
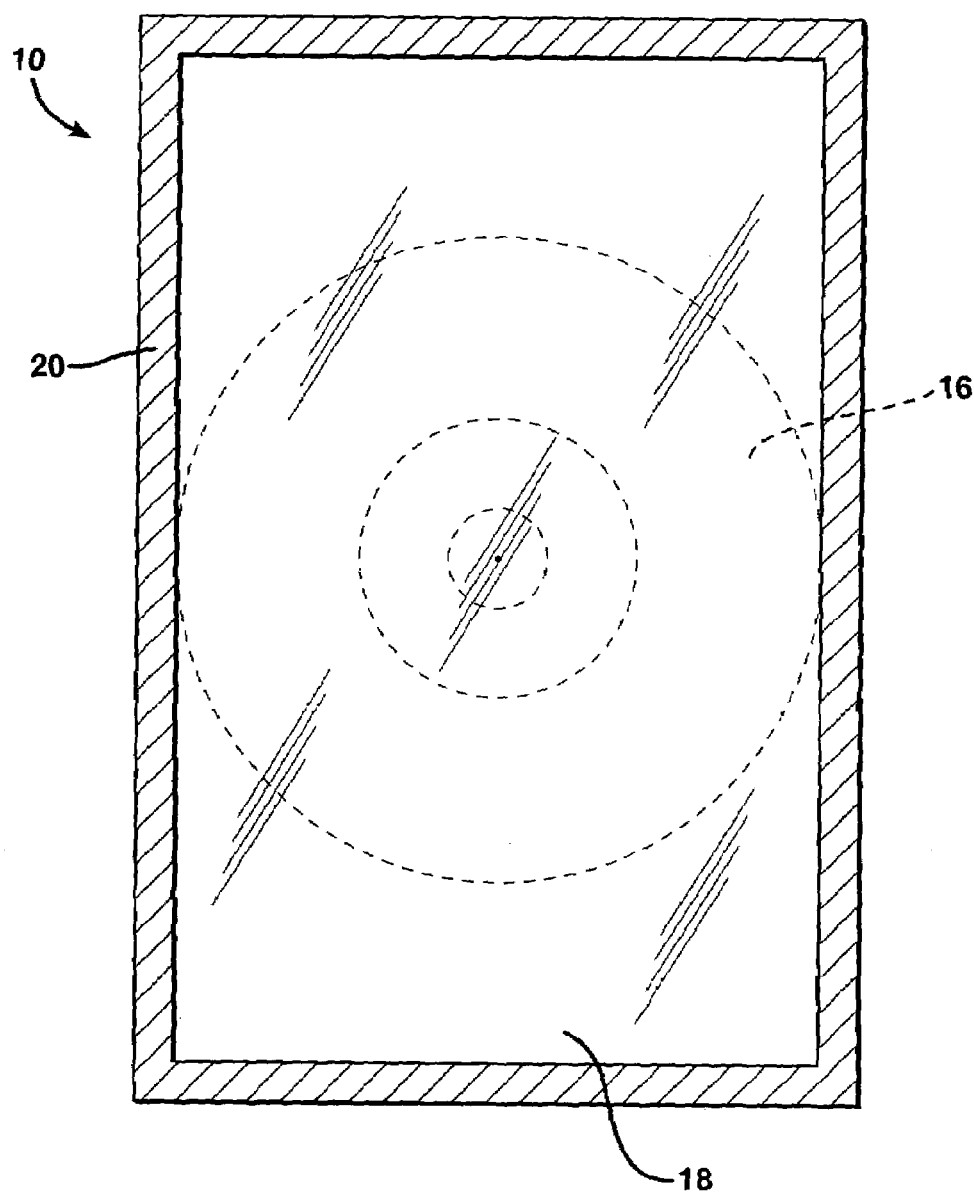
FIG. 1 is a plan view of a first embodiment of a package in accordance with the invention.

Although the present invention and its associated methodology may be described with respect to a single type of optical storage media, the ordinarily skilled artisan will readily appreciate that these teachings may also be applied to other types of limited-lifetime optical storage media.

"Electronic article surveillance" and "EAS" herein refers to commercially available systems for inhibiting the theft of goods from retail stores using an active tag associated with each article, which triggers an alarm when entering an interrogation zone at the store exit. The EAS tag reacts to signals transmitted by EAS security devices positioned at the exits of the store. Upon being interrogated by a specific signal, the EAS tag is adapted to emit a signal that is detectable by an EAS receiver, which can then activate an alarm. The preferred anti-theft device is integral to the primary package, increasing the security of the overall package. There are several types of EAS systems presently in use including RF, microwave, harmonic, and acousto-magnetic or magnetomechanical techniques for spatial magnetic interrogation and novel tags. EAS technology is disclosed e.g. in U.S. Pat. No. 5,744,791 (Isaac et al.), U.S. Pat. No. 5,859,587 (Alicot et al.), U.S. Pat. No. 5,884,425 (Baldwin), all incorporated by reference herein in their entirety. The technology described in WO 96/31790, sometimes referred to as "Flying Null" technology, is based on exploiting the behavior of magnetic materials as they pass through a region of space containing a magnetic null. Passive tags containing one or more magnetic elements can perform as remotely-readable data carriers, the number and spatial arrangement of the elements representing information such as a unique package identifier.

"Ethylene/alpha-olefin copolymer" (EAO) herein refers to copolymers of ethylene with one or more comonomers selected from $C_4$ to $C_{10}$ alpha-olefins such as butene-1, hexene-1, octene-1, etc. in which the molecules of the copolymers comprise long polymer chains with relatively few side chain branches arising from the alpha-olefin which was reacted with ethylene. This molecular structure is to be contrasted with conventional high pressure low or medium density polyethylenes which are highly branched with respect to EAOs and which high pressure polyethylenes contain both long chain and short chain branches. EAO includes such heterogeneous materials as linear medium density polyethylene (LMDPE), linear low density polyethylene (LLDPE), and very low and ultra low density polyethylene (VLDPE and ULDPE), such as DOWLEX™ or ATTANE™ resins supplied by Dow, ESCORENE™ or EXCEED™ resins supplied by Exxon; as well as linear homogeneous ethylene/alpha olefin copolymers (HEAO) such as TAFMER™ resins supplied by Mitsui Petrochemical Corporation, EXACT™ resins supplied by Exxon, or long chain branched (HEAO) AFFINITY™ resins supplied by the Dow Chemical Company, or ENGAGE™ resins supplied by DuPont Dow Elastomers.

"Ethylene homopolymer or copolymer" herein refers to ethylene homopolymer such as low density polyethylene; ethylene/alpha olefin copolymer such as those defined herein; ethylene/vinyl acetate copolymer; ethylene/alkyl acrylate copolymer; ethylene/(meth)acrylic acid copolymer; or ionomer resin.

"EVOH" herein refers to the saponified product of ethylene/vinyl ester copolymer, generally of ethylene/vinyl acetate copolymer, wherein the ethylene content is typically between 20 and 60 mole % of the copolymer, and the degree of saponification is generally higher than 85%, preferably higher than 95%.

"High density polyethylene" (HDPE) herein refers to a polyethylene having a density of between 0.94 and 0.965 grams per cubic centimeter.

"Linear low density polyethylene" (LLDPE) herein refers to polyethylene having a density between 0.917 and 0.925 grams per cubic centimeter.

"Linear medium density polyethylene" (LMDPE) herein refers to polyethylene having a density between 0.926 grams per cubic centimeter and 0.939 grams per cubic centimeter.

"Oxygen barrier" herein refers to polymeric or metallic materials with low oxygen transmission rates, i.e. with high barrier to oxygen. It is preferred that the oxygen permeability of the barrier, in the absence of the oxygen scavenger, be less than 500 cubic centimeters of oxygen/square meter·day·atmosphere ($cm^3$ $O_2/m^2 \cdot d \cdot atm$.) tested at 1 mil thick, at 25° C., at 0% relative humidity, according to ASTM D3985, and more preferably less than 100, more preferably less than 50 and most preferably less than 25 $cm^3$ $O_2/m^2 \cdot d \cdot atm$., such as less than 10, less than 5, and less than 1 $cm^3$ $O_2/m^2 \cdot d \cdot atm$. Examples of polymeric materials with low oxygen transmission rates are ethylene/vinyl alcohol copolymer (EVOH), polyvinylidene dichloride (PVDC), vinylidene chloride copolymer such as vinylidene chloride/methyl acrylate copolymer, polyamide, polyester, polyacrylonitrile (available as Barex™ resin), or blends thereof. Oxygen barrier materials may further comprise high aspect ratio fillers that create a tortuous path for permeation (e.g., nanocomposites). The oxygen barrier of materials may be further enhanced by the incorporation of an oxygen scavenger. Alternatively, metal foil, metallized substrates (e.g. metallized polyethylene terephthalate (PET), metallized polyamide, or metallized polypropylene), or coatings comprising SiOx or AlOx compounds can be used to provide low oxygen transmission to the package.

"Oxygen scavenger", and the like herein means a composition, compound, continuous or discontinuous film layer, coating, or the like, which can consume, deplete or react with oxygen from a given environment. "Oxygen scavenger" herein includes those scavengers disclosed in U.S. Pat. No. 5,350,622, and a method of initiating oxygen scavenging generally is disclosed in U.S. Pat. No. 5,211,875. Both patents are incorporated herein by reference in their entirety. According to U.S. Pat. No. 5,350,622, oxygen scavengers are made of an ethylenically unsaturated hydrocarbon and transition metal catalyst. The preferred ethylenically unsaturated hydrocarbon may be either substituted or unsubstituted. As defined herein, an unsubstituted ethylenically unsaturated hydrocarbon is any compound that possesses at least one aliphatic carbon-carbon double bond and comprises 100% by weight carbon and hydrogen. A substituted ethylenically unsaturated hydrocarbon is defined herein as an ethylenically unsaturated hydrocarbon which possesses at least one aliphatic carbon-carbon double bond and comprises about 50%–99% by weight carbon and hydrogen. Preferable substituted or unsubstituted ethylenically unsaturated hydrocarbons are those having two or more ethylenically unsaturated groups per molecule. More preferably, it is a polymeric compound having three or more ethylenically unsaturated groups and a molecular weight equal to or greater than 1,000 weight average molecular weight. Examples of unsubstituted ethylenically unsaturated hydrocarbons include, but are not limited to, diene polymers such as polyisoprene, (e.g., transpolyisoprene) and copolymers thereof, cis and trans 1,4-polybutadiene, 1,2-polybutadienes, (which are defined as those polybutadienes possessing greater than or equal to 50% 1,2 microstructure), and copolymers thereof, such as styrene-butadiene copolymer. Such hydrocarbons also include polymeric compounds such as polypentenamer, polyoctenamer, and other polymers prepared by cyclic olefin metathesis; diene oligomers such as squalene; and polymers or copolymers with unsaturation derived from dicyclopentadiene, norbornadiene, 5-ethylidene-2-norbornene, 5-vinyl-2-norbornene, 4-vinylcyclohexene, 1,7-octadiene, or other monomers containing more than one carbon-carbon double bond (conjugated or non-conjugated). Examples of substituted ethylenically unsaturated hydrocarbons include, but are not limited to, those with oxygen-containing moieties, such as esters, carboxylic acids, aldehydes, ethers, ketones, alcohols, peroxides, and/or hydroperoxides. Specific examples of such hydrocarbons include, but are not limited to, condensation polymers such as polyesters derived from monomers containing carbon-carbon double bonds, and unsaturated fatty acids such as oleic, ricinoleic, dehydrated ricinoleic, and linoleic acids and derivatives thereof, e.g. esters. Such hydrocarbons also include polymers or copolymers derived from (meth)allyl (meth)acrylates. Suitable oxygen scavenging polymers can be made by trans-esterification. Such polymers are disclosed in U.S. Pat. No. 5,859,145 (Ching et al.) (Chevron Research and Technology Company), incorporated herein by reference as if set forth in full. The composition used may also comprise a mixture of two or more of the substituted or unsubstituted ethylenically unsaturated hydrocarbons described above. While a weight average molecular weight of 1,000 or more is preferred, an ethylenically unsaturated hydrocarbon having a lower molecular weight is usable, especially if it is blended with a film-forming polymer or blend of polymers. Ethylenically unsaturated hydrocarbons which are appropriate for forming solid transparent layers at room temperature are preferred for scavenging oxygen in the package as described herein. For most applications where transparency is necessary, a layer which allows at least 50% transmission of visible light is preferred. When making transparent oxygen-scavenging layers, 1,2-polybutadiene is useful at room temperature. For instance, 1,2-polybutadiene can exhibit transparency, mechanical properties and processing characteristics similar to those of polyethylene. In addition, this polymer is found to retain its transparency and mechanical integrity even after most or all of its oxygen uptake capacity has been consumed, and even when little or no diluent resin is present. Even further, 1,2-polybutadiene exhibits a relatively high oxygen uptake capacity and, once it has begun to scavenge, it exhibits a relatively high scavenging rate as well. When oxygen scavenging at low temperatures is desired, 1,4-polybutadiene, and copolymers of styrene with butadiene, and styrene with isoprene are useful. Such compositions are disclosed in U.S. Pat. No. 5,310,497 issued to Speer et al. on May 10, 1994 and incorporated herein by reference as if set forth in full. In many cases, it may be desirable to blend the aforementioned polymers with a polymer or copolymer of ethylene. Other oxygen scavengers which can be used in connection with this invention are disclosed in U.S. Pat. No. 5,958,254 (Rooney), incorporated by reference herein in its entirety. These oxygen scavengers include at least one reducible organic compound which is reduced under predetermined conditions, the reduced form of the compound being oxidizable by molecular oxygen, wherein the reduction and/or subsequent oxidation of the organic compound occurs independent of the presence of a transition metal catalyst. The reducible organic compound is preferably a quinone, a photoreducible dye, or a carbonyl compound which has absorbence in the UV spectrum.

An additional example of oxygen scavengers which can be used in connection with this invention are disclosed in PCT patent publication WO 99/48963 (Chevron Chemical et al.). These oxygen scavengers include a polymer or oligomer having at least one cyclohexene group or functionality. These oxygen scavengers include a polymer having a polymeric backbone, cyclic olefinic pendent group, and linking group linking the olefinic pendent group to the polymeric backbone.

An oxygen scavenging composition suitable for use with the invention comprises:

(a) a polymer or lower molecular weight material containing substituted cyclohexene functionality according to the following diagram:

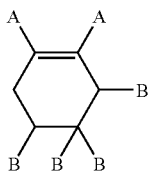

where A may be hydrogen or methyl and either one or two of the B groups is a heteroatom-containing linkage which attaches the cyclohexene ring to the said material, and wherein the remaining B groups are hydrogen or methyl;

(b) a transition metal catalyst; and optionally (c) a photoinitiator.

An additional example of oxygen scavengers which can be used in connection with this invention are disclosed in U.S. Pat. No. 6,254,803 (Matthews et al.) and U.S. Pat. No. 6,254,804 (Matthews et al.) directed to polyester and EMCM-type compositions capable of scavenging oxygen, and both incorporated herein by reference in their entirety. The Matthews et al. '03 patent claims a composition comprising a polymer or oligomer having at least one cyclohexene group, and a transition metal salt, compound, or complex, wherein the polymer or oligomer is prepared from the reaction of a tetrahydrophthalic anhydride with at least one of a diol, a hydroxy compound, or a polyhydroxy compound. The Matthews et al. '04 patent claims a composition comprising a polymer or oligomer having at least one cyclohexene group, and a transition metal salt, compound, or complex, wherein the polymer or oligomer is prepared from the reaction of a tetrahydrobenzyl alcohol with one or more compounds having an ester functionality.

Other oxygen scavengers which can be beneficially used in connection with the invention include ascorbate; isoascorbate; sulfite; ascorbate and a transition metal catalyst, the catalyst comprising a simple metal or salt, or a compound, complex or chelate of the transition metal; a transition metal complex or chelate of a polycarboxylic acid, salicylic acid, or polyamine; tannin; or reduced metal such as iron.

The compositions may be polymeric in nature or they may be lower molecular weight materials. In either case they may be blended with further polymers or other additives. In the case of low molecular weight materials they will most likely be compounded with a carrier resin before use. When used in forming a package, the oxygen scavenging composition can include only the above-described polymers and a transition metal catalyst.

However, photoinitiators can be added to further facilitate and control the initiation of oxygen scavenging properties. Adding a photoinitiator or a blend of photoinitiators to the oxygen scavenging composition can be preferred, especially where antioxidants have been added to prevent premature oxidation of the composition during processing and storage. Suitable photoinitiators are known to those skilled in the art. See, e.g., PCT publication WO 97/07161, WO 97/44364, WO 98/51758, and WO 98/51759. Specific examples of suitable photoinitiators include, but are not limited to, benzophenone, and its derivatives, such as methoxybenzophenone, dimethoxybenzophenone, dimethylbenzophenone, 4-phenylbenzopenone, diphenoxybenzophenone, allyloxybenzophenone, diallyloxybenzophenone, dodecyloxybenzophenone, dibenzosuberone, 4,4'-bis(4-isopropylphenoxy) benzophenone, 4-morpholinobenzophenone, 4-aminobenzophenone, tribenzoyl triphenylbenzene, tritoluoyl triphenylbenzene, 4,4'-bis(dimethylamino)benzophenone, acetophenone and its derivatives, such as, o-methoxy-acetophenone, 4'-methoxy-acetophenone, valerophenone, hexanophenone, α-phenyl-butyrophenone, p-morpholinopropiophenone, benzoin and its derivatives, such as, benzoin methyl ether, benzoin butyl ether, benzoin tetrahydropyranyl ether, 4-o-morpholinodeoxybenzoin, substituted and unsubstituted anthraquinones, α-tetralone, acenaphthenequinone, 9-acetylphenanthrene, 2-acetyl-phenanthrene, 10-thioxanthenone, 3-acetyl-phenanthrene, 3-acetylindole, 9-fluorenone, 1-indanone, 1,3,5-triacetylbenzene, thioxanthen-9-one, isopropylthioxanthen-9-one, xanthene-9-one, 7-H-benz[de]anthracen-7-one, 1'-acetonaphthone, 2'-acetonaphthone, acetonaphthone, benz[a]anthracene-7,12-dione, 2,2-dimethoxy-2-phenylacetophenone, α,α-diethoxyacetophenone, α,α-dibutoxyacetophenone, 4-benzoyl-4'-methyl (diphenyl sulfide) and the like. Single oxygen-generating photosensitizers such as Rose Bengal, methylene blue, and tetraphenylporphine as well as polymeric initiators such as poly(ethylene carbon monoxide) and oligo[2-hydroxy-2-methyl-1-[4-(1-methylvinyl)phenyl]propanone] also can be used. However, photoinitiators are preferred because they generally provide faster and more efficient initiation. When actinic radiation is used, photoinitiators also can provide initiation at longer wavelengths, which are less costly to generate and present less harmful side effects than shorter wavelengths. When a photoinitiator is present, it can enhance and/or facilitate the initiation of oxygen scavenging by the composition of the present invention upon exposure to radiation. The amount of photoinitiator can depend on the amount and type of cyclic unsaturation present in the polymer, the wavelength and intensity of radiation used, the nature and amount of antioxidants used, and the type of photoinitiator used. The amount of photoinitiator also can depend on how the scavenging composition is used. For instance, if a photoinitiator-containing composition is in a film layer, which underneath another layer is somewhat opaque to the radiation used, more initiator might be needed. However, the amount of photoinitiator used for most applications ranges from about 0.01 to about 10% (by wt.) of the total composition. Oxygen scavenging can be initiated by exposing an article containing the composition of the present invention to actinic or electron beam radiation. Also suitable for use in the present invention is the oxygen scavenger of U.S. Pat. No. 6,255,248 (Bansleben et al.), issued Jul. 3, 2001, incorporated herein by reference in its entirety, which discloses a copolymer of ethylene and a strained, cyclic alkylene, preferably cyclopentene, and a transition metal catalyst. Another oxygen scavenger which can be used in connection with this invention is the oxygen scavenger of U.S. Pat. No. 6,214,254 (Gauthier et al.) issued Apr. 10, 2001, incorporated herein by reference in its entirety, which discloses ethylene/vinyl aralkyl copolymer and a transition metal catalyst. As indicated above, the oxygen scavenging hydrocarbon is combined with a transition metal catalyst. Suitable metal catalysts are those which can readily interconvert between at least two oxidation states. Preferably, the catalyst is in the form of a transition metal salt, with the metal selected from the first, second or third transition series of the Periodic Table. Suitable metals include, but are not limited to, manganese II or III, iron II or III, cobalt II or III, nickel II or III, copper I or II, rhodium II, III or IV, and ruthenium II or III. The oxidation state of the metal when introduced is not necessarily that of the active form. The metal is preferably iron, nickel or copper, more preferably manganese and most preferably cobalt. Suitable counterions for the metal include, but are not limited to, chloride, acetate, stearate, palmitate, caprylate, linoleate, tallate, 2-ethylhexanoate, neodecanoate, oleate or naphthenate. Particularly preferable salts include cobalt (II) 2-ethylhexanoate, cobalt stearate, and cobalt (II) neodecanoate. The metal salt may also be an ionomer, in which case a polymeric counterion is employed. Such ionomers are well known in the art. Any of the above-mentioned oxygen scavengers and transition metal catalyst can be further combined with one or more polymeric diluents, such as thermoplastic polymers which are typically used to form film layers in plastic packaging articles. In the manufacture of certain packaging articles well known thermosets can also be used as the polymeric diluent. Polymers which can be used as the diluent include, but are not limited to, polyethylene terephthalate (PET), polyethylene, low or very low density polyethylene, ultra-low density polyethylene, linear low density polyethylene, polypropylene, polyvinyl chloride, polystyrene, and ethylene copolymers such as ethylene-vinyl acetate, ethylene-alkyl (meth)acrylates, ethylene-(meth)acrylic acid and ethylene-(meth)acrylic acid ionomers. Blends of different diluents may also be used. However, the selection of the polymeric diluent largely depends on the article to be manufactured and the end use. Such selection factors are well known in the art. Further additives can also be included in the composition to impart properties desired for the particular article being manufactured. Such additives include, but are not necessarily limited to, fillers, pigments, dyestuffs, antioxidants, stabilizers, processing aids, plasticizers, fire retardants, anti-fog agents, etc. The mixing of the components listed above is preferably accomplished by melt blending at a temperature in the range of 50° C. to 300° C. However, alternatives such as the use of a solvent followed by evaporation may also be employed. The blending may immediately precede the formation of the finished article or preform or precede the formation of a feedstock or masterbatch for later use in the production of finished packaging articles. Preferred oxygen scavengers include OS Films™ available from Cryovac, Inc., as well as ZERO₂™ technology available from CSIRO (Commonwealth Scientific and Industrial Research Organization).

"Plastic reclosable fastener" herein refers to articles such as pressure sensitive adhesive strips or tapes of a type well known in the art. "Plastic reclosable fastener" herein also refers to "zippers" have male and female fastener elements in the form of reclosable interlocking rib and groove elements that permit the package to be opened, closed, and reopened, i.e. provide reclosability. Two popular types of zippers are the "pinch" zipper, in which the male and female components are pressed together manually to close the zipper, and the "slide" zipper, in which a typically semi-rigid slider is installed on the zipper, and is run transversely along the length of the zipper to close the zipper. Examples of the pinch zipper are disclosed in U.S. Pat. No. 5,059,036 (Richison et al.), U.S. Pat. No. 5,147,272 (Richison et al.), and U.S. Pat. No. 5,147,272 (Richison et al.) all incorporated herein by reference in their entirety. An example of the slide zipper is U.S. Pat. No. 5,007,143 (Herrington), incorporated herein by reference in its entirety. A typical zipper is one which has a groove or other indentation installed on the surface of a first member, and a rib or other protrusion on the surface of a second member, which rib or other protrusion can interlock into the groove or other indentation when the first and second members are pressed together. Alternatively, a first member having a plurality of grooves or other indentations installed on the surface thereof, and a second member having a plurality of ribs or other protrusions, can interlock when the first and second members are pressed together. In this alternative case, there may be no substantial difference in appearance between the two members, as the ribs may simply be the intervals between grooves on a strip which may lock into another of the same kind. More generally, some form of male/female interengagement is used to join two surfaces together. The interlocking members will typically be manufactured such that a flange is present around the border of the members. This flange essentially carries the interlocking portions of the overall zipper, and facilitates attachment by heat sealing, gluing, or other means of adhesion to the package of which the zipper forms the closure feature. Zippers are commercially available that are coated with a coating to enhance or inhibit adhesion of the zipper to selected materials with which the zipper will be associated. Those skilled in the art will be acquainted with reclosable plastic zipper technology.

"Polyamide" herein refers to polymers having amide linkages along the molecular chain, and preferably to synthetic polyamides such as nylons. Furthermore, such term encompasses both polymers comprising repeating units derived from monomers, such as caprolactam, which polymerize to form a polyamide, as well as polymers of diamines and diacids, and copolymers of two or more amide monomers, including nylon terpolymers, sometimes referred to in the art as "copolyamides". "Polyamide" specifically includes those aliphatic polyamides or copolyamides commonly referred to as e.g. polyamide 6 (homopolymer based on ε-caprolactam), polyamide 6,9 (homopolycondensate based on hexamethylene diamine and azelaic acid), polyamide 6,10 (homopolycondensate based on hexamethylene diamine and sebacic acid), polyamide 6,12 (homopolycondensate based on hexamethylene diamine and dodecandioic acid), polyamide 11 (homopolymer based on 11-aminoundecanoic acid), polyamide 12 (homopolymer based on ω-aminododecanoic acid or on laurolactam), polyamide 6/12 (polyamide copolymer based on ε-caprolactam and laurolactam), polyamide 6/6,6 (polyamide copolymer based on ε-caprolactam and hexamethylenediamine and adipic acid), polyamide 6,6/6,10 (polyamide copolymers based on hexamethylenediamine, adipic acid and sebacic acid), modifications thereof and blends thereof. Said term also includes crystalline or partially crystalline, or amorphous, aromatic or partially aromatic, polyamides. Examples of partially crystalline aromatic polyamides include meta-xylylene adipamide (MXD6), copolymers such as MXD6/MXDI, and the like. Examples of amorphous, semi-aromatic polyamides nonexclusively include poly(hexamethylene isophthalamide-co-terephthalamide) (PA-6,I/6T), poly(hexamethylene isophthalamide) (PA-6,I), and other polyamides abbreviated as PA-MXDI, PA-6/MXDT/I, PA-6,6/6I and the like.

"Polyester" herein refers to a thermoplastic polymer in which the main polymer backbones are formed by the esterification condensation of polyfunctional alcohols and acids. Copolyesters are included. An example of a polyester is polyethylene terephthalate.

"Polymer" herein refers to homopolymer, copolymer, terpolymer, etc. "Copolymer" herein includes copolymer, terpolymer, etc. "PVDC" herein refers to any vinylidene chloride copolymer wherein a major amount of the copolymer comprises vinylidene chloride and a minor amount of the copolymer comprises one or more unsaturated monomers copolymerizable therewith, typically vinyl chloride, and alkyl acrylates or methacrylates (e.g. methyl acrylate or methyl methacrylate) and the blends thereof in different proportions. Generally, a PVDC barrier layer will contain plasticizers and/or stabilizers as known in the art.

"Radio Frequency Identification Device" and "RFID" herein refer to technology that uses electromagnetic energy as a medium through which to send information. An RFID device is used for electronic identification. The RFID contains a microchip with a unique identification number and specialized micro-electronic circuitry (a transponder) for communicating this unique number to an RFID reader. The RFID is called a passive communication device because it does not contain a battery. Rather, it uses electromagnetic energy received from the RFID reader to power the transponder and send a radio signal containing the unique identification number back to the reader. This number can then be fed directly to a computer for recording. Typically, RFID tags are devices which are affixed to various articles so that these articles may be easily tracked during movement from one point to another or identified through a sales transaction. Therefore, one may tag objects so that they may be identified or tracked automatically via a reader which is frequently connected to a host computer that may contain additional data related to an object's identification number which is associated with the RFID tag. Furthermore, the RFID tag generally contains programmed information about an object to which it is attached. Through the use of such information, RFID technology may be used to identify objects automatically and without manual handling operations as is required in most bar code systems.

"Trigger" and the like refers herein to that process defined in U.S. Pat. No. 5,211,875, whereby oxygen scavenging is initiated by exposing a web, composition, film, etc. to actinic radiation having a wavelength of less than about 750 nm at an intensity of at least about 1.6 $mW/cm^2$ or an electron beam at a dose of at least about 0.2 megarads, wherein after initiation the oxygen scavenging rate is at least about 0.05 cc oxygen per day per gram of oxidizable organic compound for at least two days after oxygen scavenging is initiated. Preferred is a method offering a short "induction period" (the time that elapses, after exposing the oxygen scavenger to a source of actinic radiation, before initiation of the oxygen scavenging activity begins) so that the oxygen scavenger can be activated at or immediately prior to use during filling and sealing of the package with an oxygen sensitive material; a method wherein the oxygen scavenging material is substantially consistently triggered across the entire internal surface of the pre-formed package; a method which is simple and readily incorporated into existing packaging procedures; and a method which is readily incorporated in-line into existing packaging systems. Thus, "trigger" refers to exposing a composition or article to actinic radiation as described above; "initiation" refers to the point in time at which oxygen scavenging actually begins; and "induction time" refers to the length of time, if any, between triggering and initiation.

"Vacuum skin packaging" is in one sense a type of thermoforming process in which the article to be packaged serves as the mold for the forming web. The article may be placed on a rigid or semi-rigid support member, that can be flat or shaped, e.g., tray-shaped, bowl-shaped or cup-shaped, such as a solid or expanded (foamed) polymeric tray, and the supported article is then passed to a chamber where a top web (such as a polymeric film or laminate) is drawn upward against a heated dome and the softened top web is then draped over the article. The movement of the web is controlled by vacuum and/or air pressure, and the interior of the container is vacuumized before final welding of the top web to the support web. The heated top web thus forms a tight skin around the product and is sealed to the support. The product is thus packaged under vacuum, and the space containing the product is evacuated from gases. It is therefore desirable that both the top web formed around the product and that used for the support member present a barrier to oxygen and other gases detrimental to the shelf or storage life of an oxygen sensitive product. Also desirable is a high degree of formability and stretchability, to avoid a common and recurrent problem in such operations: the occurrence of wrinkles and other irregularities in the final packaged product.

"Web" herein means a film, laminate, sheet, web, coating, or the like which can be used to package an optical data storage medium.

Any compositional percentages used herein are presented on a "by weight" basis, unless designated otherwise.

DETAILED DESCRIPTION OF THE INVENTION

Figure 2:
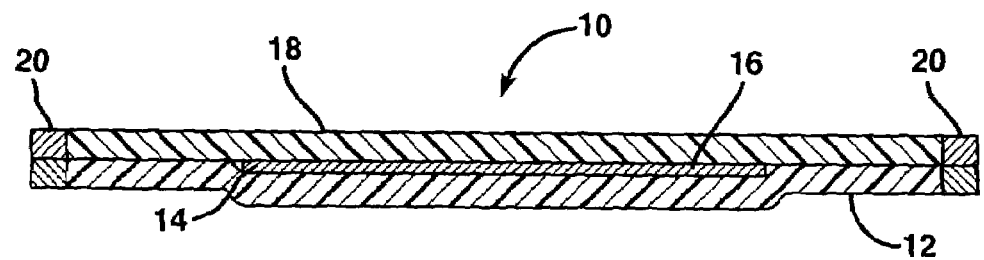
FIG. 2 is a side elevational view of the package of FIG. 1.

A first embodiment in accordance with the present invention is shown in FIGS. 1 and 2. A primary package 10 includes a thermoformed (preferably bottom) web 12, with a shallow pocket 14 to hold an optical data storage medium 16, such as a compact disc or DVD. A covering (preferably non-formed and preferably top) web 18 covers the optical data storage medium (here, a compact disc) and is adhered to thermoformed web 12 by means of a perimeter heat seal 20.

Heat sealing can be accomplished by any suitable means well known in the art, e.g. by impulse or continuous heat sealing bars, RF sealing, and the like. Other forms of sealing can be used as appropriate, including pressure sensitive adhesives, or ultrasonic sealing.

Thermoforming is well known in the packaging art, and is the process whereby a thermoplastic web is heat softened and reshaped to conform to the shape of a cavity in a mold.

It should be noted herein that thermoformed web 12 is preferably a "bottom" web, i.e. in normal usage, the package will rest on the web 12 such that the web 12 comprises the bottom of the package. Likewise, covering web 18 is preferably a "top" web, i.e. in normal usage, the package will be positioned such that the web 18 comprises the top of the package. This description is for convenience in understanding the invention. Nevertheless, those skilled in the art will understand, after a review of the invention, that the package can be manufactured, stored, shipped, and/or displayed in any suitable orientation, so that for example the package can be placed on a supporting surface such that the thermoformed web functions as the top of the package, and the covering web functions as the bottom of the package.

The thermoformed and covering webs can be made from any appropriate polymeric material, and preferably comprise olefinic polymers or copolymers, especially ethylene polymers or copolymers, such as ethylene/alpha-olefin copolymers. These webs can be of monolayer construction, but are preferably of multilayer construction. They preferably include an oxygen barrier material, either as an extruded layer or a coating, in or on either or both of the thermoformed and covering web.

The thermoformed web can be a rigid or semi-rigid thermoformed material, or barrier foam or dense closed cell foam material. In a foam construction, preferred materials are polyoletin, polystyrene, and polycarbonate.

The thickness and composition of the gas barrier layer will be suitably selected in order to provide the overall structure with an oxygen transmission rate (evaluated by ASTM D3985) of preferably less than 500 cubic centimeters of oxygen/square meter·day·atmosphere ($cm^3O_2/m^2 \cdot d \cdot atm$) tested at 1 mil thick, at 25° C., at 0% relative humidity, preferably less than 150 $cm^3O_2/m^2 \cdot d \cdot atm$. at room temperature and 0% relative humidity, more preferably less than 100, and even more preferably less than 50 $cm^3O_2/m^2 \cdot d \cdot atm$., such as less than 25, less than 15, less than 5, and less than 1 $cm^3O_2/m^2 \cdot d \cdot atm$.

Other layers can be present in both the thermoformed and covering webs. Said additional layers can serve the purpose of providing the necessary bulk to the webs, or improving their mechanical properties, i.e. increased puncture resistance, increased abuse resistance, etc., or to better tie the various layers one to the other.

At least one of the thermoformed and covering webs includes an oxygen scavenger, e.g. in the form of a coating or a discrete layer. Although the oxygen scavenger is preferably disposed in the covering web, optionally the thermoformed web could also include an oxygen scavenger. Alternatively, the thermoformed web can include an oxygen scavenger instead of the covering web. All optical data storage media, e.g. DVD-5, contain within them one or more metallized layers that is an effective oxygen barrier from one side of the disc. The active face of the disc, i.e. the side that is interrogated by a laser when the disc is played, preferably faces the web having the oxygen scavenger.

The preferred format of the package is a vacuumized package. Vacuum packages are in general well known in the art, including the steps of making such packages. In one such process which can be used to make the package of FIGS. 1 and 2, a first, thermoformable web is advanced over a mold, is heated to soften the web, and then, with or without a plug or other assist, is drawn into the mold by vacuum to create a thermoformed web having a shallow cavity. The cavity is configured to accommodate an optical data storage medium, such as a CD or DVD. The optical data storage medium is placed, by e.g. manual or mechanical means, into the shallow cavity formed by the thermoforming process. A second web, which is typically but not necessarily non-thermoformed, is placed over the first web, preferably in a congruent relationship so as to define a package with mating edges. The optical data storage medium is thereby covered. As this step takes place, and/or thereafter, a vacuum is drawn from the interior of the package. The package is perimeter sealed and individual packages are produced by transverse cuts in the respective webs to produce discrete packages. Thermoforming and web handling equipment are commercially available. After the initial vacuum step, and before and/or during sealing, the package can optionally be gas flushed with an inert gas or gas mixture, such as nitrogen, carbon dioxide, or a nitrogen/carbon dioxide mixture, and then revacuumized. In vacuum packages, it may be desirable to include one or more thermoformed channels that radiate from the main pocket (see FIG. 13). These would provide additional stiffness to the package and in cases where only one web scavenges, would expose more surface area of the scavenging film allowing more rapid oxygen depletion.

Alternatively, a MAP package, and especially a MAP package with a low headspace, can be made. If a MAP package is used, additional heat-seal regions can optionally be used to hold the disc stationary in the package (see FIG. 11). MAP packages can be produced essentially as described herein with respect to vacuum packages, but only a vacuum step and the subsequent gas flush step are implemented, without a revacuumization of the package.

Alternatively, the package of the invention can be made without either a vacuum or gas flush step, although in this embodiment it may be more difficult to insure that oxygen in the package does not result in premature inactivation of the limited lifetime optical data storage medium.

Webs of the present invention can have any total thickness desired, so long as the webs provide the desired properties for the particular packaging operation in which the film is used. Final web thicknesses can vary, depending on process, end use application, etc. Typical thicknesses range between 0.1 to 20 mils, preferably between 0.3 and 15 mils, more preferably 0.5 to 10 mils, more preferably 1 to 8 mils, more preferably 3 to 6 mils, such as 4 to 5 mils. Top webs will typically have a thickness of between 2 and 5 mils; bottom webs will typically have a thickness of between 5 and 10 mils.

Webs of the present invention can be made by any suitable process, including coextrusion, lamination, and extrusion coating, and are preferably made by tubular cast coextrusion, flat cast coextrusion, or by a hot blown coextrusion process. Films can be optionally stretch oriented, but are preferably not stretch oriented.

The primary package can be used as is to store optical data storage media. Alternatively, the primary package can be inserted in, and optionally adhered to, a paperboard sleeve or envelope, or inserted into the pocket of a booklet (see FIG. 3). The outer surface layers of the primary package are preferably compatible with various types of adhesives in order to form an integral package with the paperboard envelope. Additionally, if the paperboard forms a book-like package, it may be desirable to have the primary plastic package extend throughout the paper to provide tear resistance. If the paperboard is easily torn, it may be possible for a thief to separate the RFID or EAS tag from the primary plastic package.

Figure 3:
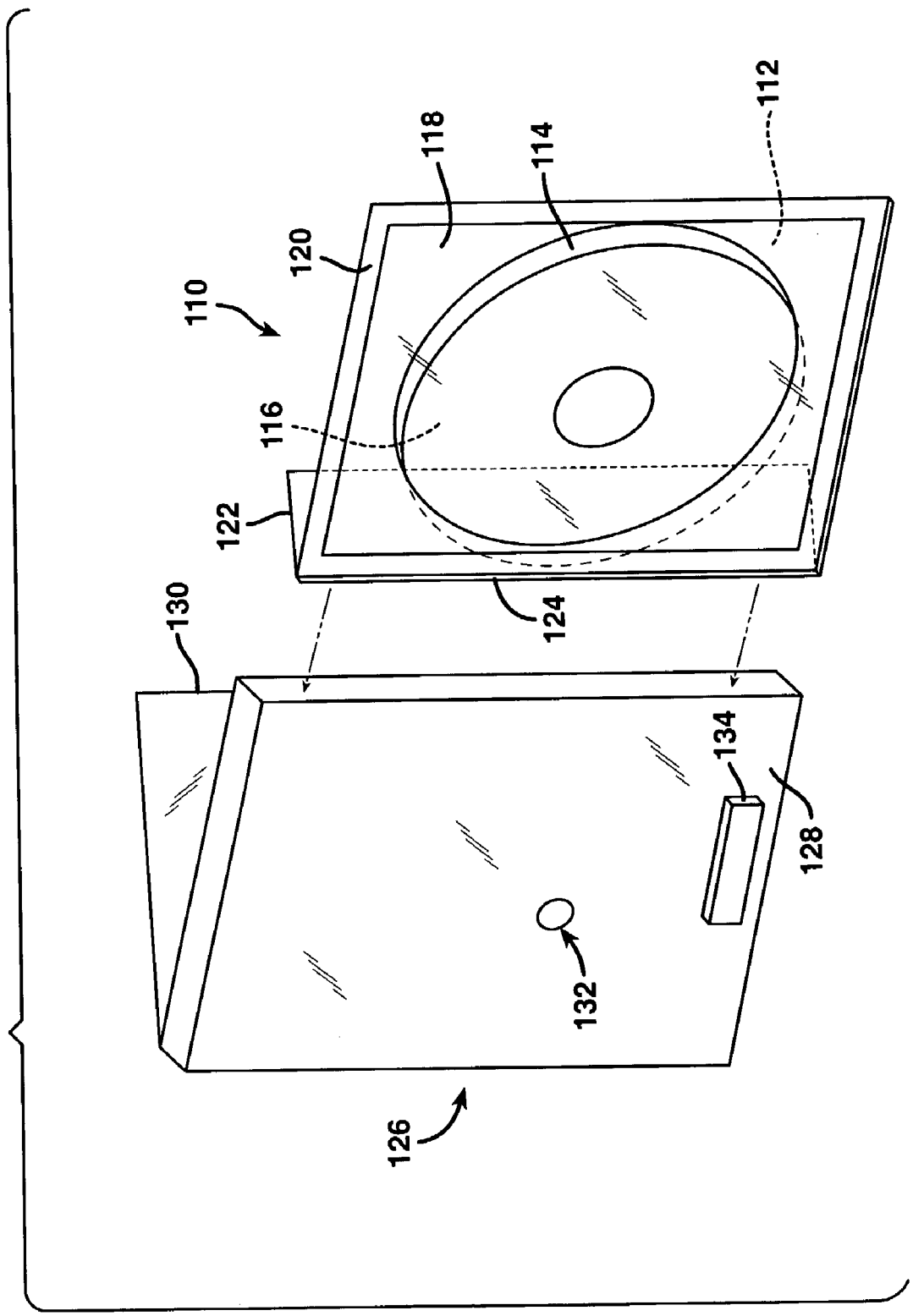
FIG. 3 is a perspective view of the package of FIGS. 1 and 2, showing its relationship to a carrying sleeve in which the package can be stored and displayed.

Referring to FIG. 3, a primary package 110 includes a thermoformed (preferably bottom) web 112, with a shallow pocket 114 to hold an optical data storage medium 116, such as a compact disc. A covering (preferably non-formed and preferably top) web 118 covers the optical data storage medium (here, a compact disc) and is adhered to thermoformed web 112 by means of a perimeter heat seal 120. An optional thermoplastic or paper flap 122 is attached to the primary package 110 by means of a hinge or fold 124 in the package. The primary package 110 can be inserted into a display or storage sleeve 126. The sleeve can be a rectilinear sleeve as illustrated, or of any other suitable shape to accommodate all or part of primary package 110. The sleeve is preferably a paperboard sleeve, but could instead be made from an alternative material such as a thermoplastic or thermoset material. A front wall 128 of the sleeve 126 can include an optional view window 132. This window can provide a means for visually determining when the optical data storage medium has become inactive. Thus, e.g. if a photochromic change has occurred in the optical data storage medium, and all or part of the optical data storage medium changes color (e.g. from an original silver color to another color), this color will be exhibited through the view window 132. This mechanism thus provides the potential purchaser with a quality control check to make sure that a defective (i.e. prematurely inactivated) CD, DVD, or other optical device is not purchased. It will also provide an after-purchase indication that the lifetime of the optical data storage medium is expired. Window 132 can also/instead be installed directly on an appropriate portion of the primary package, either after the package is made, or on one of the webs making up the package. This embodiment can be useful especially in cases where the primary package is not sufficiently transparent to view the color of the optical data storage medium.

A flap 130 can optionally be included as part of the sleeve 126. The flap 130 is preferably a paperboard, but could instead be made from an alternative material such as a thermoplastic or thermoset material. Flap 130 can be used to form a booklet, and additionally pages or flaps can be added.

A human or machine readable unique identifier such as a barcode or RFID tag 134 can optionally be included on the front wall 128 or at some other location on sleeve 126. Any unique identifier such as a bar code or RFID tag will offer information to a host computer that identifies and confirms the genuineness of the packaged optical data storage medium, and conversely identifies pirated or spurious copies of the contents of the optical data storage medium. In addition to providing authentication, a unique identifier on each package allows for product tracking and inventory management. Such identifiers can also be used in the event that it is necessary to recall defective products. Coupon offers and rebates are readily facilitated by having unique identifiers on each package. The unique identifier prevents a coupon or rebate from being used more than once by an unscrupulous consumer. An EAS tag 134 provides anti-theft protection, e.g. in a retail environment.

The package of the invention can optionally include a means for opening the package, and these are graphically depicted in FIGS. 4, 5, 6, and 7. Because optical data storage media are easily scratched or damaged by sharp objects, the package of the invention preferably has a means for opening the package, and especially an easy opening mechanism. Easy peel sealants can be beneficially used in a package having a pull-tab.

Figure 4:
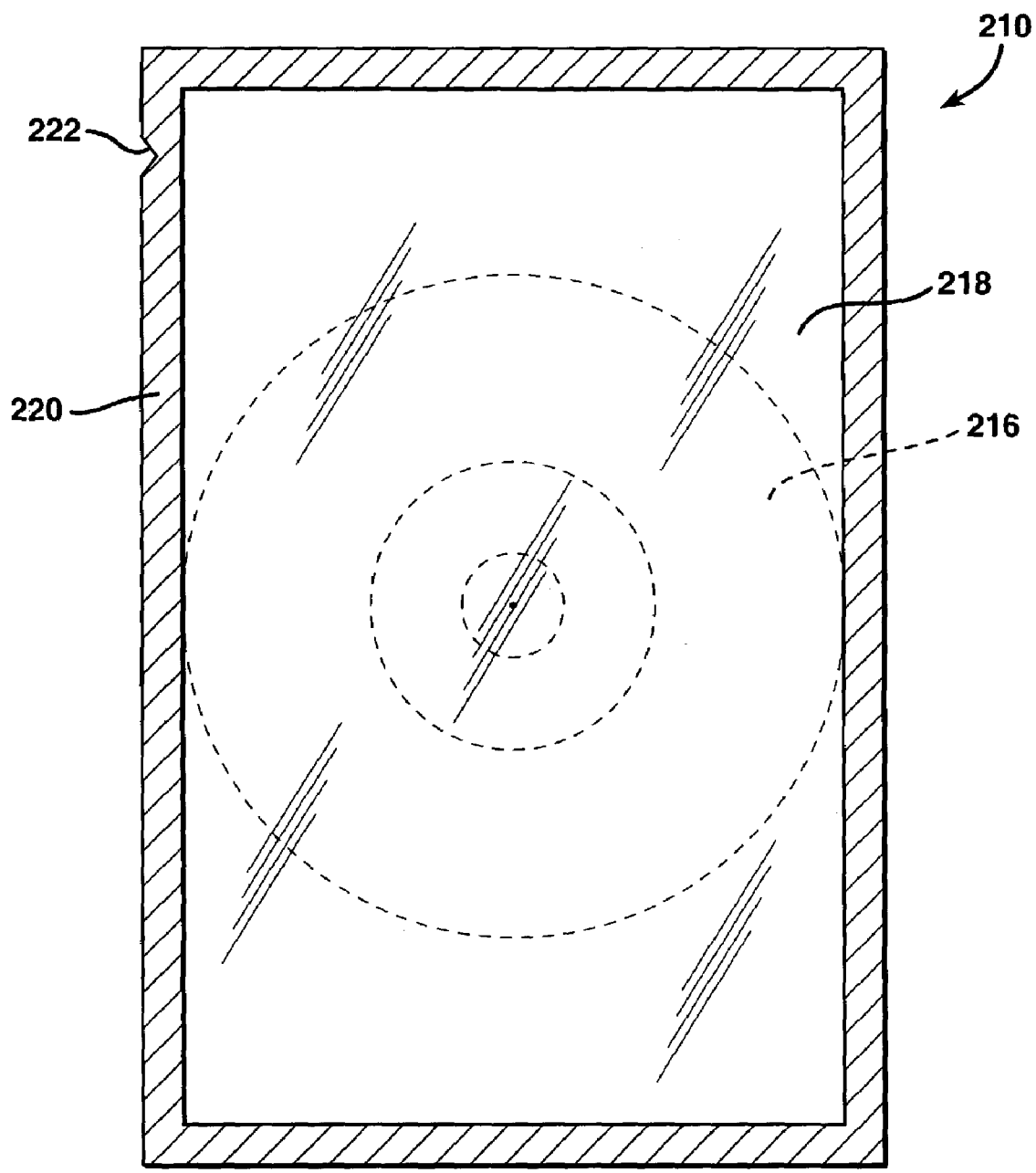
FIG. 4 is a view of the package of FIG. 1, and including a means for opening the package in the form of a tear notch.

Referring to FIG. 4, a primary package 210 corresponds to primary package 10 of FIGS. 1 and 2, and includes an optical data storage medium 216, such as a compact disc. A covering (preferably non-formed and preferably top) web 218 covers the optical data storage medium (here, a compact disc) and is adhered to a thermoformed web by means of a perimeter heat seal 220. A tear notch 222 is disposed at an edge of the package. The tear notch can be made manually or by any well known notching device. In operation, the upper and lower portions of the package as viewed, i.e. the portion above the tear notch and the portion below the tear notch are grasped, and pulled in different directions to separate the package portions and provide access to the enclosed optical data storage medium.

Figure 5:
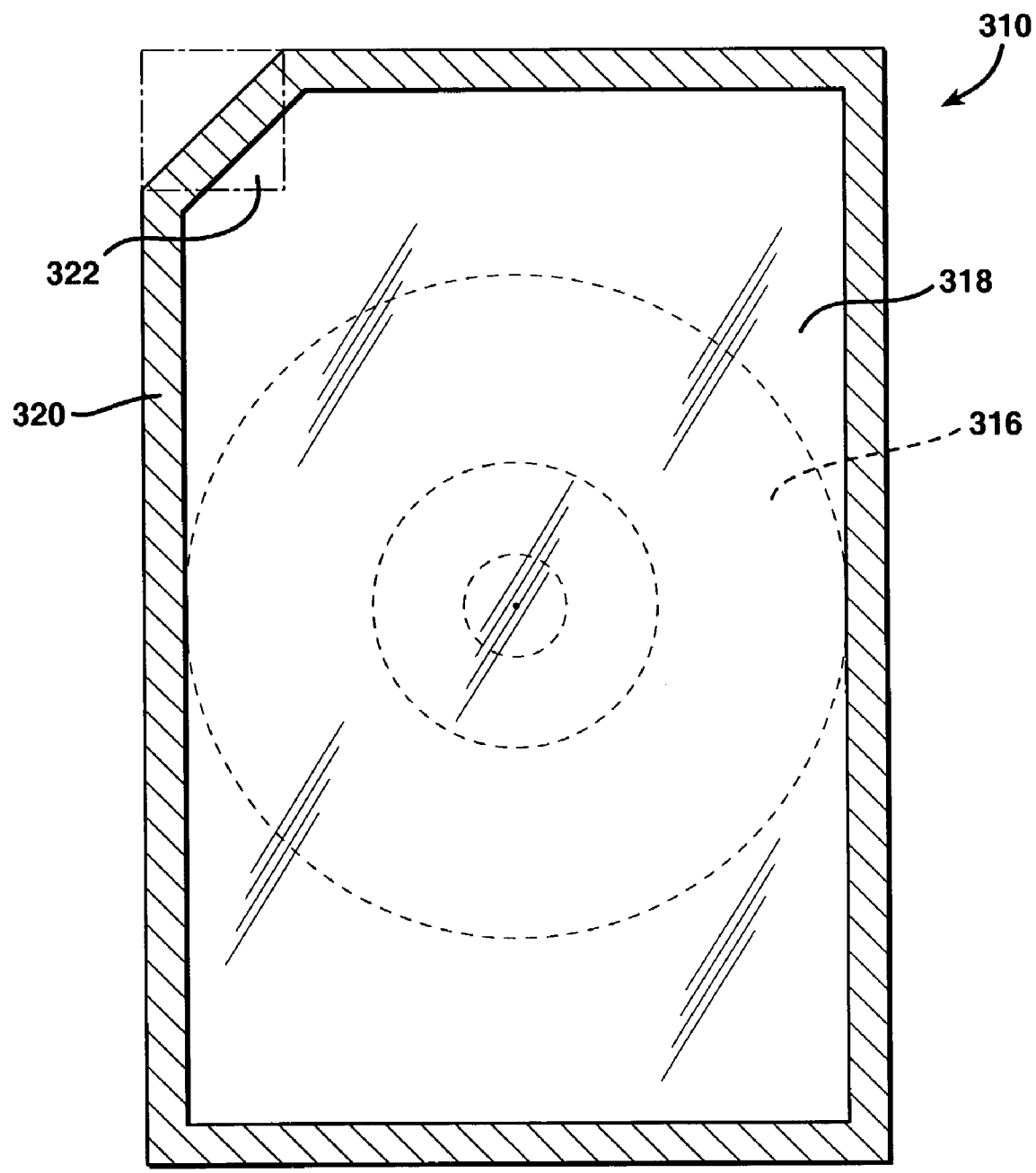
FIG. 5 is a view of the package of FIG. 1, and including a means for opening the package in the form of a pull tab.

Referring to FIG. 5, a primary package 310 corresponds to primary package 10 of FIGS. 1 and 2, and includes an optical data storage medium 316, such as a compact disc. A covering (preferably non-formed and preferably top) web 318 covers the optical data storage medium (here, a compact disc) and is adhered to a thermoformed web by means of a perimeter heat seal 320. A pull tab 322 is disposed at a corner of the package. The pull tab can be made manually or by any well known mechanical device. In operation, the pull tab is grasped, and pulled toward the center of the package to provide access to the enclosed optical data storage medium. The pull tab of FIG. 5 is preferably coupled with easy peel sealants, i.e. the materials and sealing properties of the thermoformable web and covering web are preferably such that the pull tab easily peels the packaging material, with a peel force of preferably less than 2.5 pounds, more preferably less than 2 pounds, such as less than 1.5 pounds, such as between 1 and 2 pounds.

Figure 6:
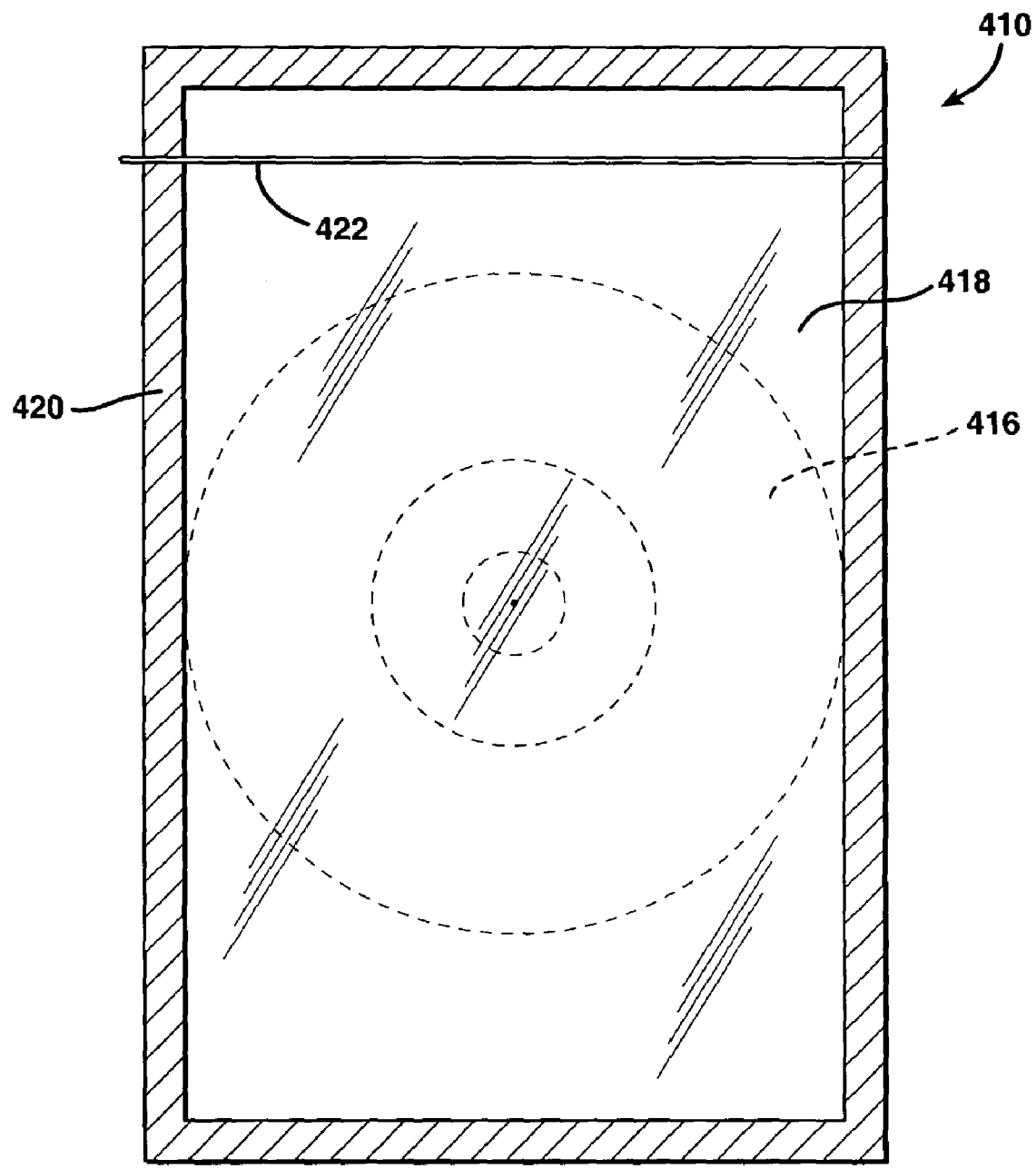
FIG. 6 is a view of the package of FIG. 1, and including a means for opening the package in the form of a tear strip.

Referring to FIG. 6, a primary package 410 corresponds to primary package 10 of FIGS. 1 and 2, and includes an optical data storage medium 416, such as a DVD. A covering (preferably non-formed and preferably top) web 418 covers the optical data storage medium (here, a DVD) and is adhered to a thermoformed web by means of a perimeter heat seal 420. A tear strip 422 extends laterally across the package, and extends at one end (shown on the left side of FIG. 6) beyond the lateral edge of the package. The tear strip 422 can be installed in the package during production of the package by manual or mechanical means well known in the art. In operation, the tear strip is grasped, and pulled across the package to provide access to the enclosed optical data storage medium. The tear notch or tear strip of FIGS. 4 and 6 are preferably coupled with an easy tear packaging materials; that is; the thermoformable web and/or covering web for such applications preferably have relatively low tear initiation and in particular low tear propagation values.

Figure 7:
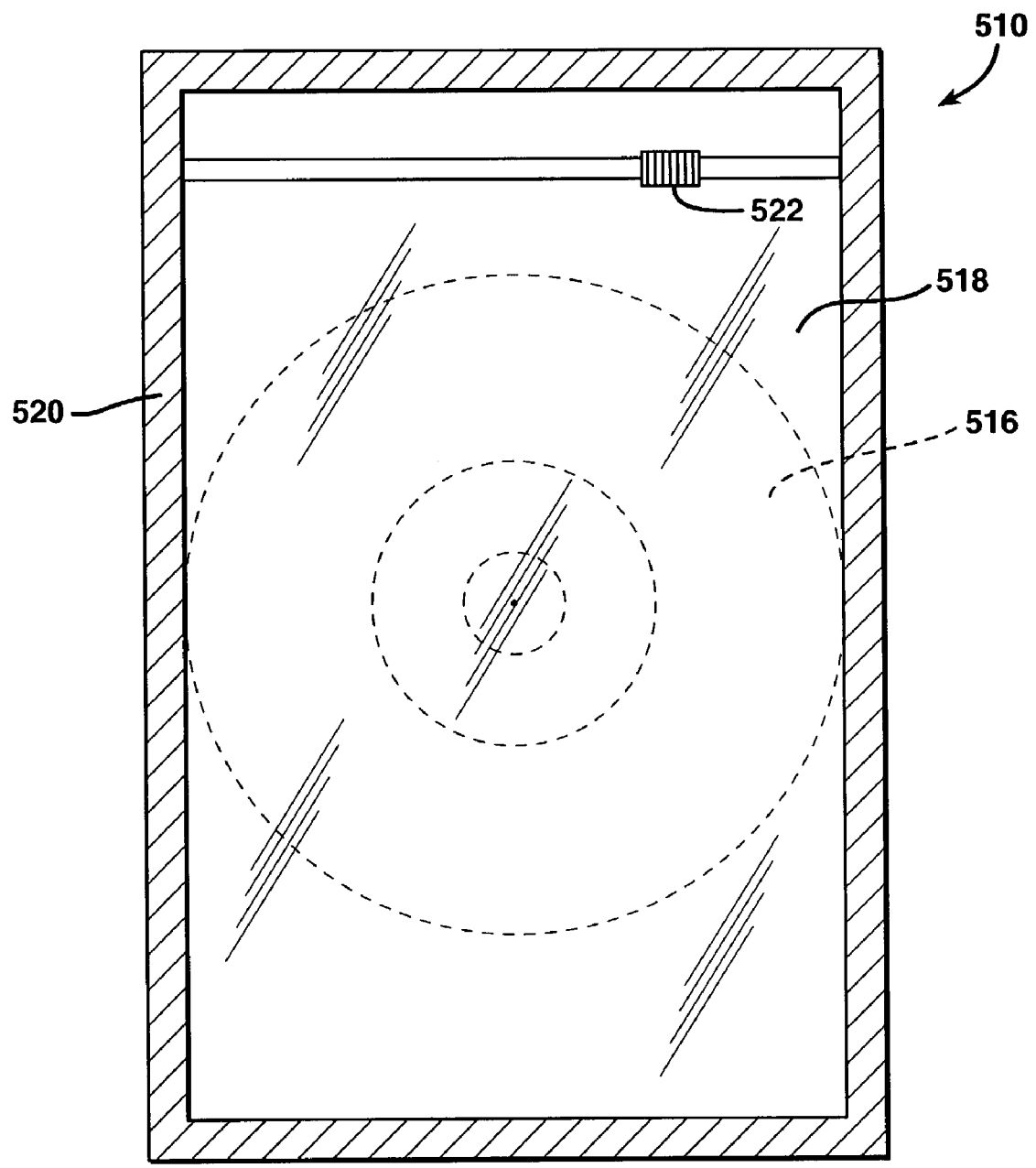
FIG. 7 is a view of the package of FIG. 1, and including a means for opening the package in the form of a plastic reclosable fastener.

Referring to FIG. 7, a primary package 510 corresponds to primary package 10 of FIGS. 1 and 2, and includes an optical data storage medium 516, such as a compact disc. A covering (preferably non-formed and preferably top) web 518 covers the optical data storage medium (here, a compact disc) and is adhered to a thermoformed web by means of a perimeter heat seal 520. A plastic reclosable fastener 522 extends laterally across the package. The plastic reclosable fastener can be installed in the package during production of the package by manual or mechanical means well known in the art. The plastic reclosable fastener has two preferred embodiments. It can take the form of a pressure sensitive adhesive strip or tape of a type well known in the art. In this embodiment, in operation, the thermoformed web and the covering web can be grasped and pulled in opposite directions to open the package and provide access to the enclosed optical data storage medium. The plastic reclosable fastener can instead take the form of a "zipper" having male and female fastener elements in the form of reclosable interlocking rib and groove elements. Either embodiment permits the package to be opened, closed, and reopened, i.e. provide reclosability. Two popular types of zippers are the "pinch" zipper, in which the male and female components are pressed together manually to close the zipper, and the "slide" zipper, in which a typically semi-rigid slider is installed on the zipper, and is run transversely along the length of the zipper to close the zipper. A pinch zipper can be opened much like the pressure sensitive adhesive strip or tape. A slide zipper is operated by grasping and laterally moving the slide across the face of the package to open the package, and provide access to the enclosed optical data storage medium. Reclosable mechanisms of the type just described allow the consumer to extend the play life of a disc once opened. The oxygen scavenging package can incorporate additional scavenging capacity to accommodate this feature (since original opening of the package and playing the disc will allow some ingress of oxygen into the disc). Conversely, it may be desirable, in order to limit the play life of a disc, to avoid excessive oxygen scavenging capacity in the relevant web, and/or not include a reclosability feature.

Figure 8:
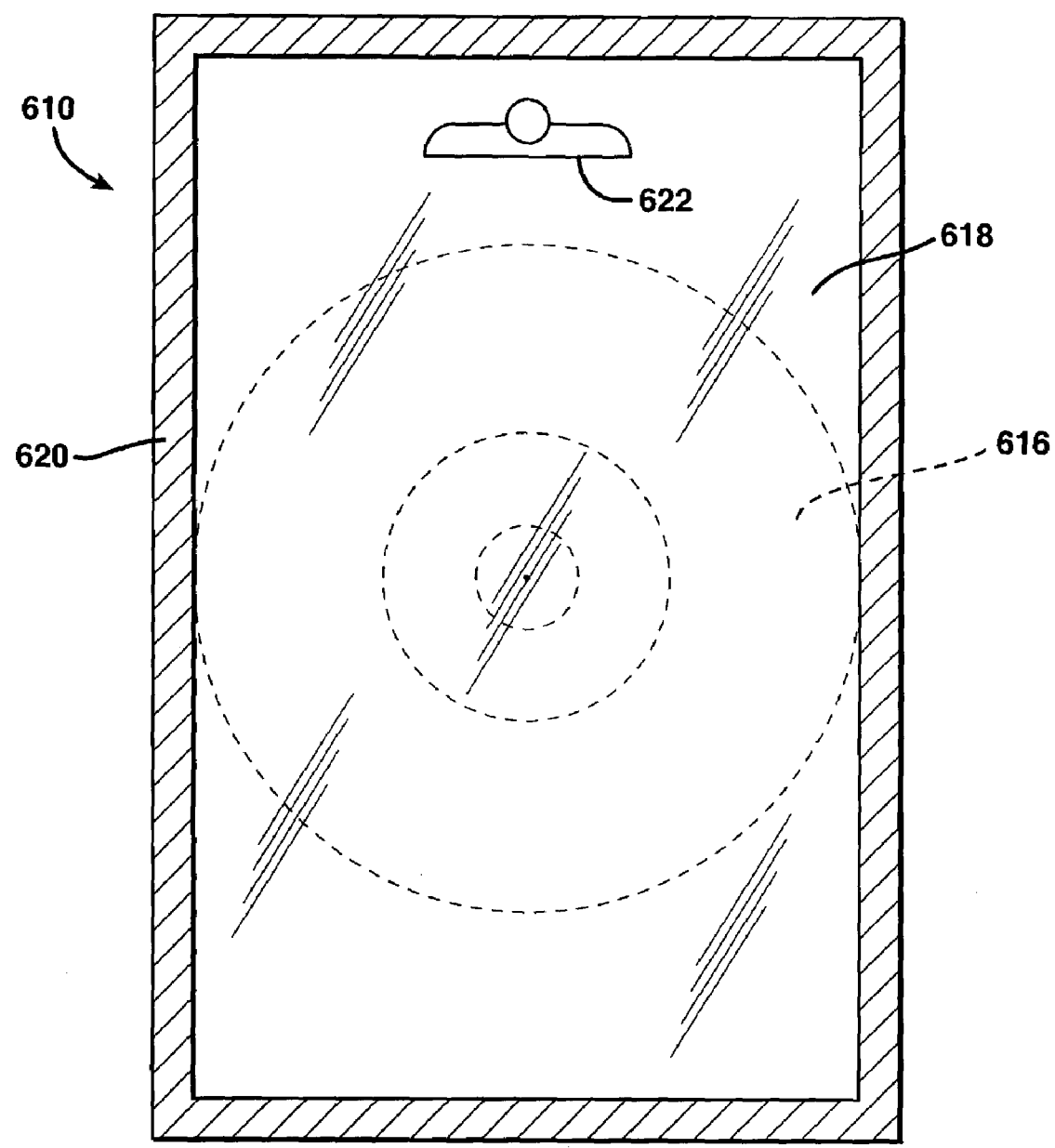
FIG. 8 is a view of the package of FIG. 1, and including a means for suspending the package.

Referring to FIG. 8, a primary package 610 corresponds to primary package 10 of FIGS. 1 and 2, and includes an optical data storage medium 616, such as a compact disc. A covering (preferably non-formed and preferably top) web 618 covers the optical data storage medium (here, a compact disc) and is adhered to a thermoformed web by means of a perimeter heat seal 620. A means for suspending the package 622, such as a hanger hole, is disposed in an upper portion of the package. The means for suspending the package can be installed in the package during production of the package by manual or mechanical means well known in the art. One method is simply punching out material, in the form of a hanger as shown, in the finished package. Alternative means for suspending, such as hooks, adhesive spots, and the like, can be used to suspend the package.

Figure 9:
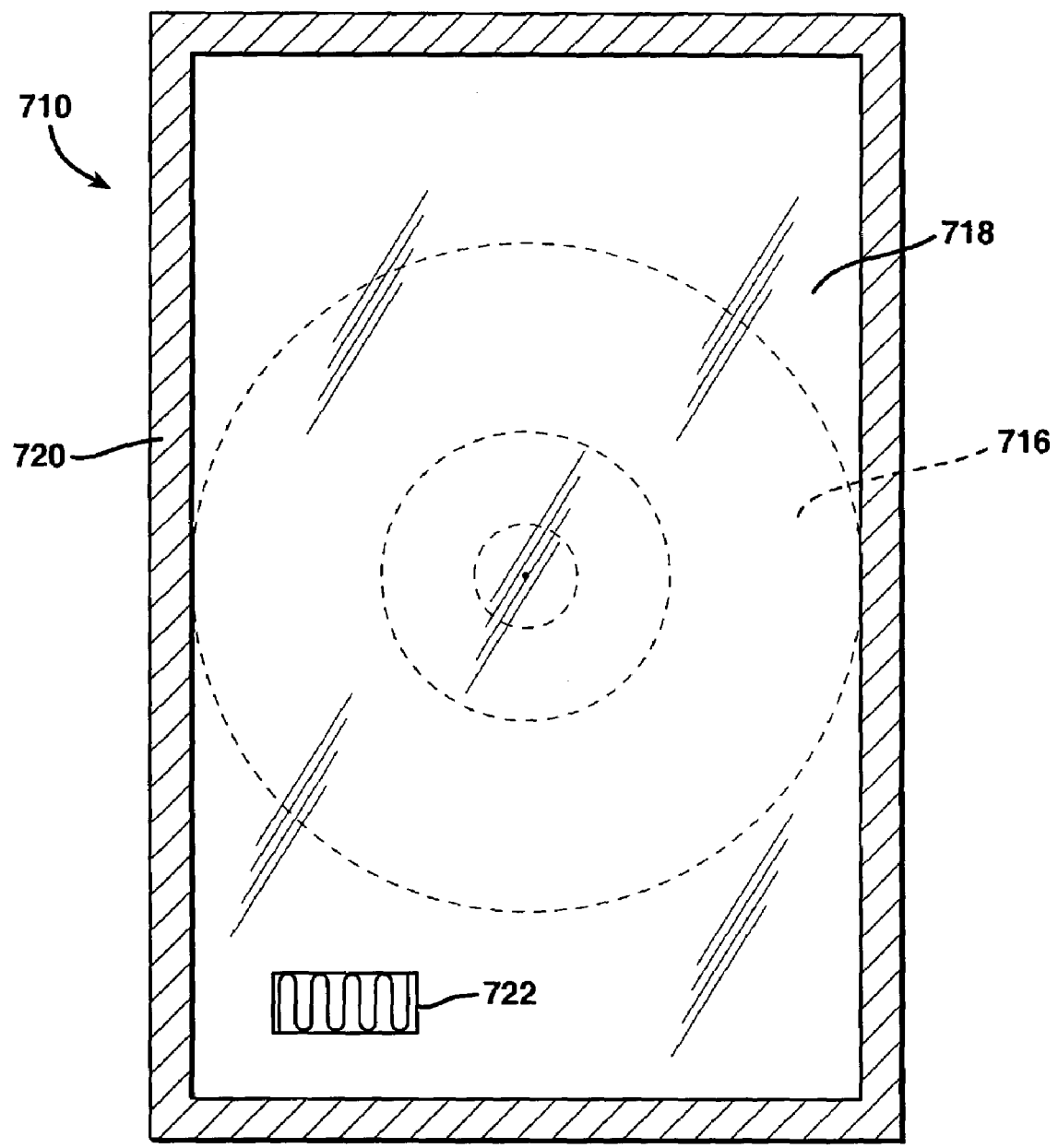
FIG. 9 is a view of the package of FIG. 1, and including a means for identifying the package.

Referring to FIG. 9, a primary package 710 corresponds to primary package 10 of FIGS. 1 and 2, and includes an optical data storage medium 716, such as a compact disc. A covering (preferably non-formed and preferably top) web 718 covers the optical data storage medium (here, a compact disc) and is adhered to a thermoformed web by means of a perimeter heat seal 720. A means for identifying the package 722, such as an RFID or EAS tag, or specifically a tag based on Flying Null technology, is attached to the thermoformed web or (as shown here) the covering web of the package. The means for identifying the package can be installed in the package during production of the package by manual or mechanical means well known in the art, such as by an adhesive backing on the tag which is then adhered to the relevant web, and can be installed either before or after the webs are brought together. A barcode or RFID tag can be printed directly on at least one of the thermoformed or covering webs, to avoid removal by a shoplifter. "Means for identifying" here is used in its broad sense to include systems geared primarily as anti-theft devices, and systems aimed primarily at providing information to a human or electronic reader re: properties of an article. For example, a Flying Null tag could be incorporated in the package to provide authenticity checking.

Figure 10:
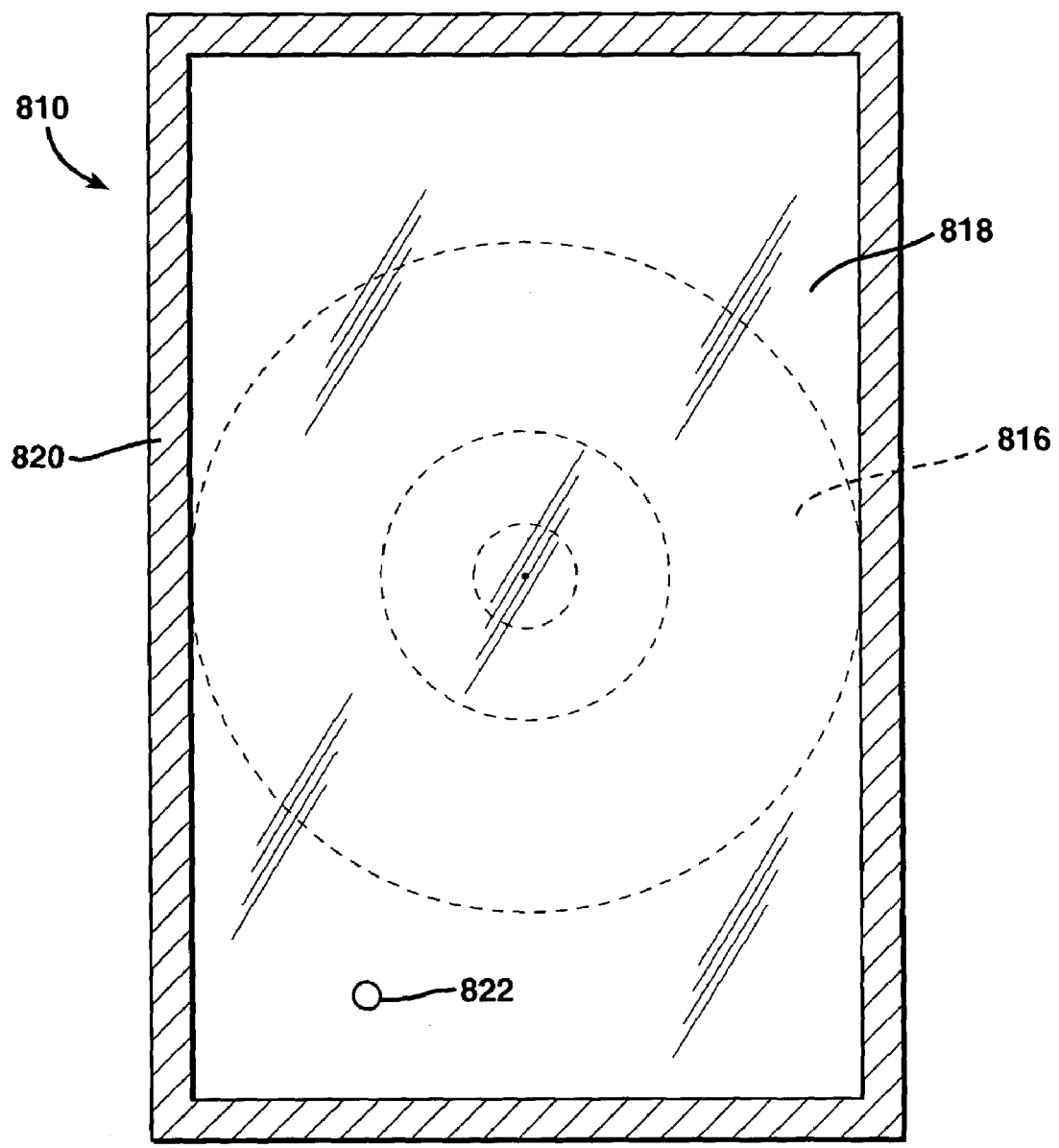
FIG. 10 is a view of the package of FIG. 1, and including a color patch.

Referring to FIG. 10, a primary package 810 corresponds to primary package 10 of FIGS. 1 and 2, and includes an optical data storage medium 816, such as a compact disc. A covering (preferably non-formed and preferably top) web 818 covers the optical data storage medium (here, a compact disc) and is adhered to a thermoformed web by means of a perimeter heat seal 820. A color patch 822, such as a window installed on one of the webs of the package, can be used in concert with an ink forming part of the optical data storage medium. The color patch 822 can be installed in the package during production of the package by manual or mechanical means well known in the art, and can be installed either before or after the webs are brought together. Printed text such as "disc expired when this color" can be printed adjacent color patch 822, and the printed color of the patch is selected to identify the color of the optical data storage medium that has become inactive.

Figure 11:
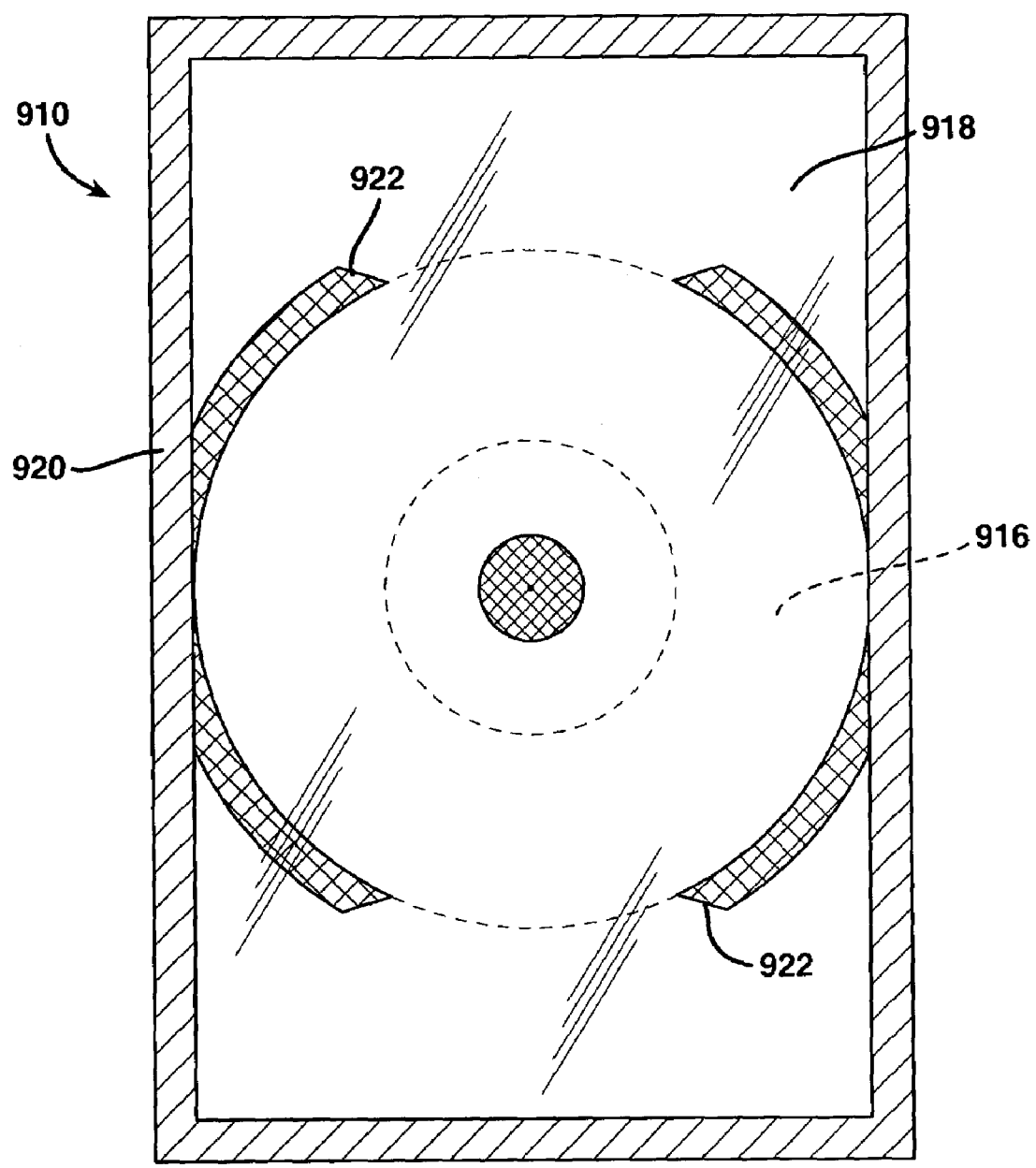
FIG. 11 is a view of the package of FIG. 1, and including sealed regions around portions of the optical data storage medium.

Referring to FIG. 11, a primary package 910 corresponds to primary package 10 of FIGS. 1 and 2, and includes an optical data storage medium 916, such as a compact disc. A covering (preferably non-formed and preferably top) web 918 covers the optical data storage medium (here, a compact disc) and is adhered to a thermoformed web by means of a perimeter heat seal 920. Sealed portions 922, the sealed portions spaced apart from the edges of the package and therefore not forming part of the perimeter seal, help to hold the optical data storage medium in place, and prevent substantial shifting of the optical data storage medium during package manufacture, shipping, and display. The sealed portions 922 can be made during production of the package, either by the same sealing mechanisms used to produce the perimeter seals, or by a separate sealing device. The sealed portions 922 can be made simultaneously with the perimeter seals, or as a separate step. Sealed portions can occupy any portion of the package, and can be discontinuous, as shown here, or be disposed in a continuous arrangement, e.g. around the entire circumference of the optical data storage medium. It should be noted that in the various embodiments of the invention as disclosed herein, a perim-eter seal and sometimes additional sealed areas intermediate the edges of the package are disclosed. The remaining portions of the interface between the thermoformed web and the covering web, and between the support member and the covering web, can remain unsealed, or can be partially or wholly sealed by any suitable means. In some cases, a peelable bond will form in some or all of the remaining portions of the web interface, such that the respective webs will be in intimate contact, often simply as a result of the package making process. This peelable bond will sometimes keep the webs in contact during normal storage and shipment, but allow the webs to be easily peeled apart in these portions of the package. Also, the cavity of the thermoformed web that accommodates the optical data storage medium can be of the same diameter or size, or of approximately the same diameter or size, as the optical data storage medium. This will provide a relatively tight fit of the optical data storage medium within the cavity. Alternatively, the processor can choose to create a cavity significantly larger than the diameter or size of the optical data storage medium. This can be done e.g. to speed up the package making process, or to allow a space around the optical data storage medium for modified atmosphere and/or the action of the oxygen scavenger. Likewise, the vertical depth of a typical disc is about 1.2 mm thick. A cavity in the thermoformed web is preferably of a depth of about 1.5 to 2.0 mm. Alternatively, a significantly deeper or shallower cavity can be made as desired.

Figure 12:
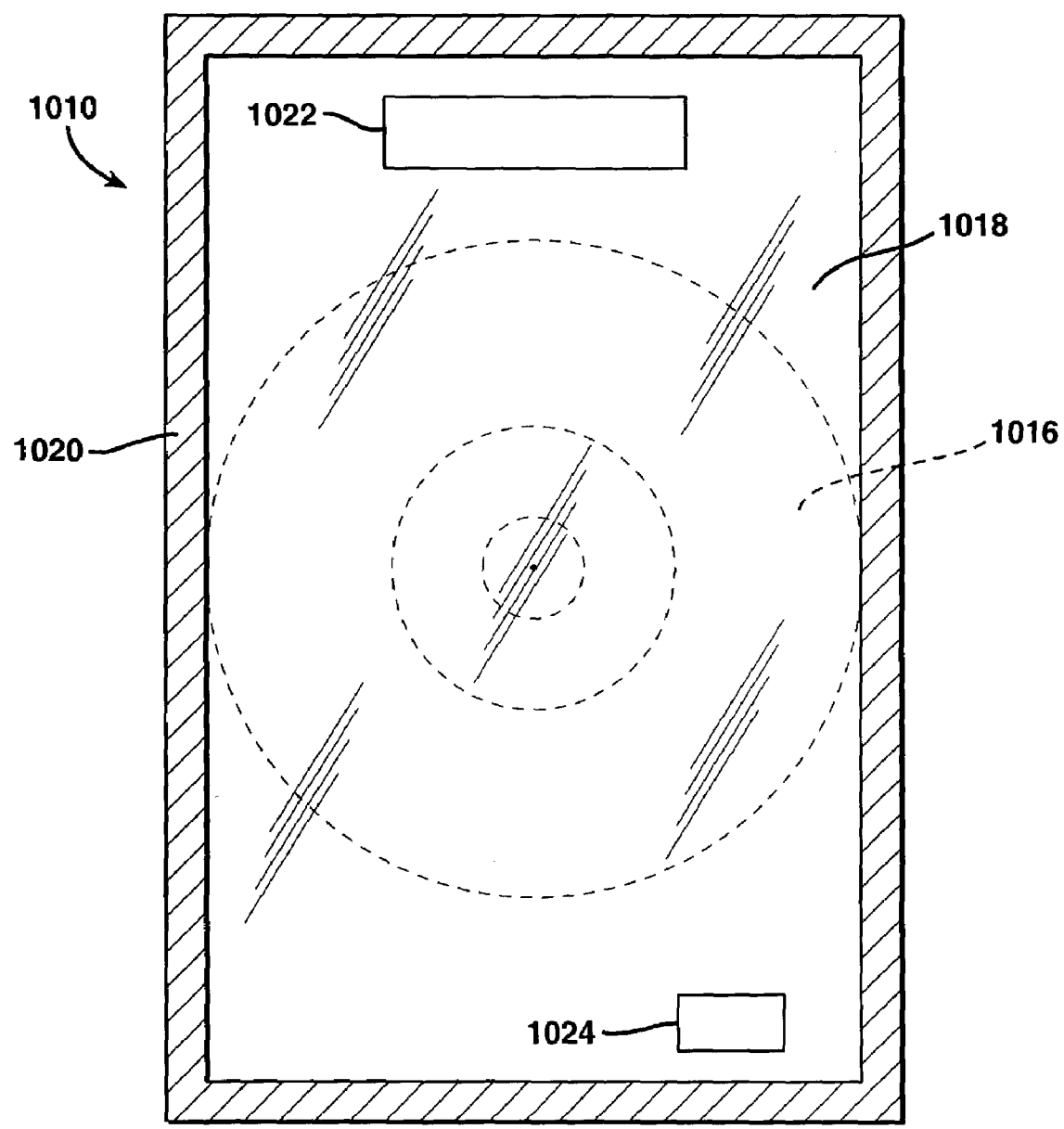
FIG. 12 is a view of the package of FIG. 1, and including a printed label.

Referring to FIG. 12, a primary package 1010 corresponds to primary package 10 of FIGS. 1 and 2, and includes an optical data storage medium 1016, such as a compact disc or DVD. A covering (preferably non-formed and preferably top) web 1018 covers the optical data storage medium (here, a compact disc) and is adhered to a thermoformed web by means of a perimeter heat seal 1020. Printed indicia 1022 and 1024 can provide printed information or graphics. For example, printed indicia 1022 can be a preprinted pressure sensitive label with advertising information, and printed indicia 1024 can include a "use by" date or expiration date. Printed indicia can also include one and two-dimensional barcodes. These indicia can be made during production of the package, by printing or adherence of pre-made labels to the package, or can be printed or adhered to either or both of the thermoformed and covering webs prior to package production, by any suitable printing process such as ink jet, flexographic, rotogravure, or the like.

Figure 13:
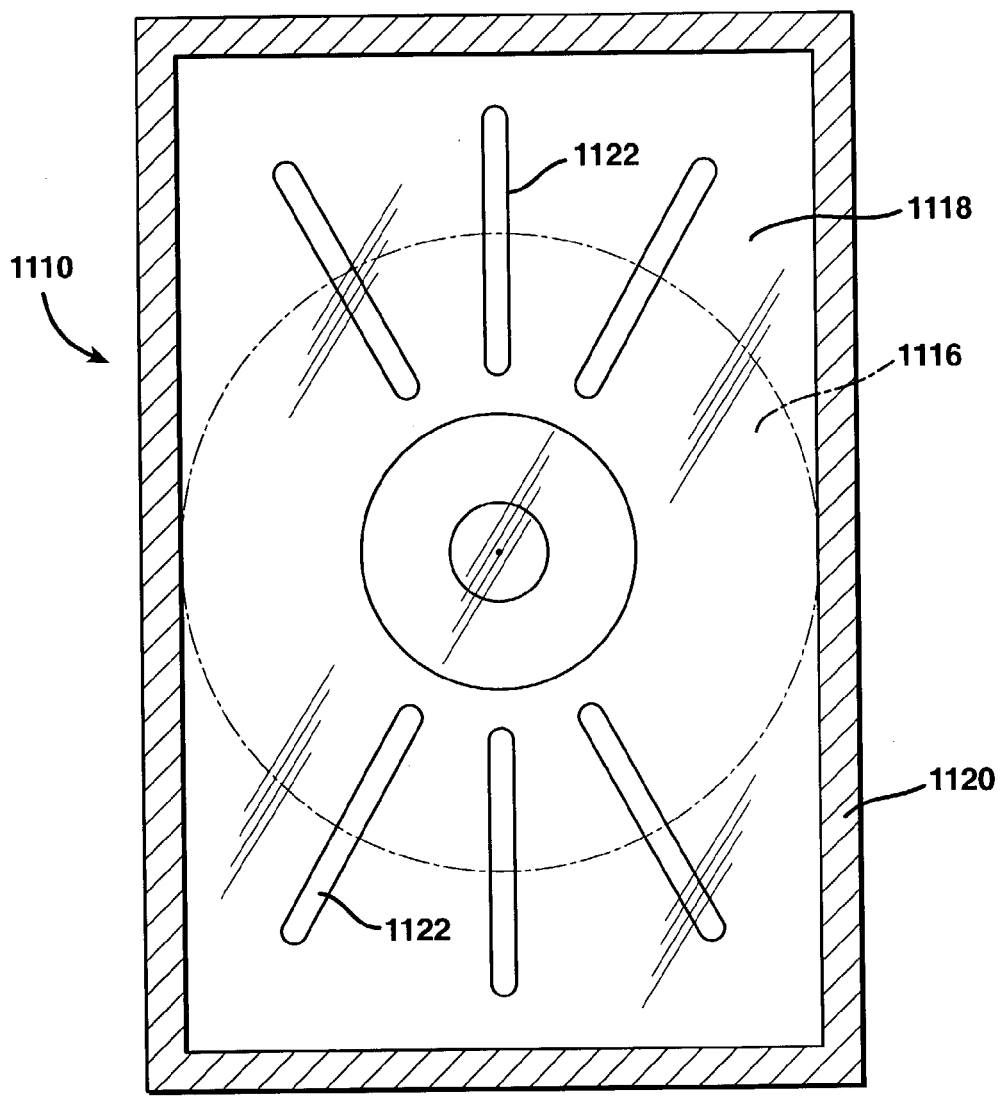
FIG. 13 is a view of the package of FIG. 1, and including a plurality of channels in the package.

Referring to FIG. 13, a primary package 1110 corresponds to primary package 10 of FIGS. 1 and 2, and includes an optical data storage medium 1116, such as a compact disc. A covering (preferably non-formed and preferably top) web 1118 covers the optical data storage medium (here, a compact disc) and is adhered to a thermoformed web by means of a perimeter heat seal 1120. One or more channels 1122 can be included in the final package. These channels can be simply raised portions of the covering web 1112 and/or thermoformed web, and can be made by predesigning a thermoforming mold to create such channels, or by other suitable means. The channels can serve at least two purposes. First, they can provide additional stiffness to the package, which can be important in packaging optical data storage media with strict flatness requirements. Secondly, in cases where only one web includes an oxygen scavenger, the channels expose more surface area of the scavenging web, allowing more rapid oxygen depletion in the package.

Figure 14:
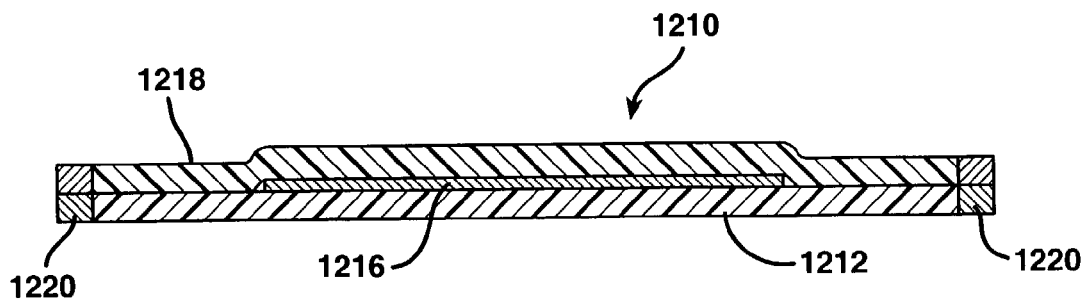
FIG. 14 is an elevational view of a VSP package in accordance with the invention.

An alternative to the thermoformed package of FIGS. 1 to 13 is a vacuum skin (VSP) package format. Referring to FIG. 14, a primary package 1210 corresponds generally to primary package 10 of FIGS. 1 and 2, and includes an optical data storage medium 1216, such as a compact disc. A covering (preferably non-formed and preferably top) web 1218 covers the optical data storage medium (here, a compact disc) and is adhered to a support member 1212 by means of a perimeter heat seal 1220. Package 1210 is thus preferably produced by a VSP process. Support member 1212 can comprise a rigid or semi-rigid material, that can be flat (as shown in FIG. 14) or shaped, and can be a solid or expanded (foamed) polymeric material. The optical data storage medium is placed on member 1212, and is then passed to a chamber where a covering web (such as a polymeric film or laminate) is drawn upward against a heated dome, softened, and then draped over the optical data storage medium. The movement of the web is controlled by vacuum and/or air pressure, and the interior of the package is vacuumized before final sealing of the covering web to the support member. The heated covering web thus forms a tight skin around the optical data storage medium and is sealed to the support member. The product is preferably packaged under vacuum, and the space containing the product is therefore preferably evacuated from gases. An advantage of this format would be rapid initiation of scavenging in the covering web due to the heat applied for forming, which would assist triggering.

Those skilled in the art will understand that modifications in the invention can be made without departing from the scope of the invention as claimed in the claims that follow.

For example, the primary package containing the optical data storage medium can be further combined with a discrete paper or plastic member to provide a hanger or header. A barrier containing paperboard, plastic or foam could be utilized as the semi-rigid thermoformed web while providing a hanger, header and/or pegboard notch. Such a package could be designed to have multiple leaves and could contain multiple discs. Packages containing multiple discs would provide separate compartments for them to be opened independently. In this format, a paperboard insert or booklet could provide additional rigidity along with the thermoformed web. A paper or paperboard insert could allow greater contact with more surface area of the scavenging web(s) by virtue of being oxygen permeable.

An alternative embodiment involves a MAP package utilizing an oxygen scavenging sachet. The package could further incorporate a standard "jewel case" to hold the optical data storage medium (or half a jewel case). Humidity control in this type package is also beneficial. Humidity control agents could optionally be incorporated into the oxygen scavenging sachet.

Colored patches can be used to illustrate for the consumer what a good and an expired optical data storage medium look like.

To facilitate the color-change chemistry, it can be desirable to control or modify the relative humidity within the package. This can be achieved by active and passive means including tailored MVTR by choice of web materials, adding water or humectants to the package, or selectively hydrating layers of the packaging material.

In another embodiment, a hybrid package can be made using a thermoformed web, as disclosed with respect to FIGS. 1 to 13, in combination with a VSP top web as disclosed with respect to FIG. 14.

In yet another embodiment, a pouch can be made from packaging material (film) of the type described herein for the respective webs of the package. Such pouches comprising an oxygen scavenger can be made on vertical or horizontal type machines. Pouches can also be provided pre-triggered. Thus, the pre-triggered pouch includes an oxygen barrier layer or coating, and an oxygen scavenger, of any of the types disclosed herein.

In one version of this embodiment, the pouch is made on a horizontal form and seal process where a tube of the packaging material is sealed at each end to form a pouch, and before or after pouch formation, the packaging material is triggered as described herein to activate the oxygen scavenger. The pouch can be provided to the packager pre-made, pre-triggered and then later cut open at one end of the pouch, an optical data storage medium is inserted in the pouch, and the pouch is optionally vacuumized and/or optionally flushed with a modified atmosphere (to create an MAP pouch) and then resealed. Horizontal tube forming equipment is well known in the art, and provided by vendors such as Multivac.

In another version, a pouch is made as just described, and triggered, but one end of the pouch is left open. One or more of such pouches can then be packaged in a master pack having an oxygen barrier construction, with or without a modified atmosphere or oxygen scavenger sachet to prevent significant scavenging to take place prior to the packaging of the optical data storage medium in each pouch. Alternatively, the pouches with one end open can be simply stacked or rolled up, and the oxygen barrier walls of the pouch will prevent significant oxygen scavenging activity prior to intended use.

Vertical forming systems can also be used to form pouches as disclosed herein. Vertical forming systems are well known in the art and are provided by vendors such as Hayssen.

In another alternative embodiment, a film disc can be cut out and placed on at least a portion of the optical data storage medium. This film disc can include an oxygen scavenger, and can e.g. be in the form of a three layer film with the structure:

Polyethylene/Oxygen Scavenger/Polyethylene

Such a film can be hot blown by otherwise conventional processes.

In yet another embodiment, the oxygen scavenger can be applied as a coating to at least a portion of the optical data storage medium. Alternatively, a label carrying or including an oxygen scavenger can be affixed to the optical data storage medium.

In still another embodiment, a pellet or wafer, or a flattened sachet, containing an oxygen scavenger, can be placed on the optical data storage medium, with or without affixing the pellet, wafer, or sachet to the optical data storage medium, before the optical data storage medium is packaged by e.g. thermoforming or vacuum skin packaging.

The oxygen scavenger disc, coating, label, pellet, wafer, or flattened sachet can be disposed on either or both sides of the optical data storage medium. The oxygen scavenger can be placed on the thermoformed web or support member before placing the optical data storage medium in the cavity of the thermoformed web, or before placing the optical data storage medium on the support member. Alternatively, or in addition, the oxygen scavenger can be placed on the thermoformed web or support member after placing the optical data storage medium in the cavity of the thermoformed web, or after placing the optical data storage medium on the support member.

Heat shrinkable films can also be used for some or all of the packaging materials employed in packaging the optical data storage medium.

Thermoforming, sealing, vacuumizing, gas flushing, heating, draping, and other steps disclosed herein can be performed by any suitable and conventional means.

The several alternative embodiments of the invention disclosed herein, and the features of these embodiments, can be used singly or in combination.

EXAMPLES

Limited lifetime DVD's were vacuum packaged utilizing a 10 mil high barrier bottom web, T6010B available from Cryovac Inc., Duncan, S.C. and an oxygen scavenging top web designated as OS1000™, also available from Cryovac. The oxygen scavenging top web was triggered with a Cryovac model 4104 Scavenging Initiation System (SIS). These packages are illustrated in FIG. 1. The discs were placed in the package such that the oxygen sensitive layer was facing the oxygen scavenging film and were stored at room temperature. A colorimeter was used to periodically measure the color of the discs, recorded as Hunter L a b values, and the percent reflectivity at 650 nm. Note that color and reflectivity measurements were made through the packaging web. Table 1 shows the typical behavior of the packaged discs.

TABLE 1

Hunter L a b Values and Percent Reflectivity
For a limited lifetime DVD packaged in Cryovac OSFilm

| Time Elapsed (days) | L | a | b | % Reflectivity at 650 nm |
|---|---|---|---|---|
| 0.0 | | | | |
| 0.7 | 78.20 | −2.66 | 3.70 | Not measured |
| 4.8 | 79.55 | −2.07 | 5.07 | Not measured |
| 12.0 | 79.52 | −1.66 | 5.05 | Not measured |
| 15.7 | 79.54 | −1.70 | 5.23 | Not measured |
| 18.7 | 79.59 | −1.43 | 5.35 | 60.7 |
| 25.7 | 79.48 | −1.59 | 5.08 | 60.2 |
| 32.7 | 79.69 | −1.34 | 5.42 | 61.2 |
| 49.9 | 79.76 | −1.21 | 5.53 | 61.9 |
| 64.7 | 79.77 | −1.32 | 5.61 | 61.7 |
| 98.0 | 79.82 | −1.24 | 5.68 | 62.1 |
| 154.9 | 79.78 | −0.82 | 5.82 | 62.5 |
| 207.7 | 79.80 | −1.10 | 6.02 | 62.8 |
| 333.9 | 79.12 | −1.57 | 5.74 | 60.4 |
| 453.9 | 79.49 | −6.74 | 1.36 | 48.4 |

The data in Table 1 show that the critical reflectivity at 650 nm does not change significantly for at least 334 days. Between about 334 days and 454 days the shelf life was reached. The Hunter a and b values show that the disc is a deep blue-green at 454 days.

What is claimed is:

1. A package for an optical data storage medium comprising:
    a) a thermoformed web having a cavity therein;
    b) an optical data storage medium disposed in the cavity of the thermoformed web; and
    c) a covering web disposed on the optical data storage medium, and on the thermoformed web, and in sealing relationship to the thermoformed web;
    wherein each of the thermoformed web and the covering web comprises an oxygen barrier material;
    wherein at least one of the thermoformed web and the covering web comprises an oxygen scavenger; and
    wherein the thermoformed web and the covering web are in congruent relationship along a perimeter of the package, and wherein a perimeter seal joins the thermoformed web and the covering web along the perimeter of the package.

2. The package of claim 1 comprising a sleeve in which the package is stored.

3. The package of claim 1 comprising a means for opening the package.

4. The package of claim 3 wherein the means for opening the package is selected from the group consisting of:
    a) a tear notch disposed at an edge of the package;
    b) a pull tab disposed at a corner of the package;
    c) a tear strip that extends laterally across the package; and
    d) a plastic reclosable fastener that extends laterally across the package.

5. The package of claim 1 comprising a means for suspending the package.

6. The package of claim 1 comprising a means for identifying the package using a human and/or machine readable unique identifier.

7. The package of claim 6 wherein the means for identifying the package is selected from the group consisting of:
    a) an RFID tag;
    b) an EAS tag; and
    c) a printed barcode.

8. The package of claim 1 comprising a means for visually determining when the optical data storage medium has become inactive.

9. The package of claim 8 wherein the means for visually determining when the optical data storage medium has become inactive, comprises a window disposed in at least one of the thermoformed web and the covering web, the window adapted to give an indicative color when the optical data storage medium becomes non-readable.

10. The package of claim 1 wherein the package has edges, and the thermoformed formed web and the covering web are sealed together at portions of the package spaced apart from the edges of the package.

11. The package of claim 10 wherein the thermoformed web and the covering web are sealed together at portions of the package adjacent the optical data storage medium.

12. The package of claim 1 wherein at least one of the thermoformed web and the covering web comprises printed indicia.

13. The package of claim 1 comprising at least one channel disposed in the package between at least a portion of the thermoformed web and the covering web.

14. The package of claim 1 wherein the oxygen barrier is a material selected from the group consisting of:
    i) ethylene/vinyl alcohol copolymer,
    ii) polyvinylidene dichloride,
    iii) vinylidene chloride/methyl acrylate copolymer,
    iv) polyamide,
    v) polyester;
    vi) polyacrylonitrile;
    vii) metal foil;
    viii) metallized polyethylene terephthalate;
    ix) metallized polyamide;
    x) metallized polypropylene;
    xi) an SiOx coating; and
    xii) an AlOx coating.

15. The package of claim 1 wherein the oxygen scavenger is a material selected from the group consisting of:
    i) oxidizable organic compound and a transition metal catalyst,
    ii) ethylenically unsaturated hydrocarbon and a transition metal catalyst, iii) a reduced form of a quinone, a photoreducible dye, or a carbonyl compound which has absorbence in the UV spectrum,
iv) a polymer having a polymeric backbone, cyclic olefinic pendent group, and linking group linking the olefinic pendent group to the polymeric backbone,
v) a copolymer of ethylene and a strained, cyclic alkylene,
vi) ethylene/vinyl aralkyl copolymer,
vii) ascorbate,
viii) isoascorbate,
ix) sulfite,
x) ascorbate and a transition metal catalyst, the catalyst comprising a simple metal or salt, or a compound, complex or chelate of the transition metal,
xi) a transition metal complex or chelate of a polycarboxylic acid, salicylic acid, or polyamine,
xii) a tannin,
xiii) reduced metal,
xiv) a polymer or oligomer having at least one cyclohexene group, and a transition metal salt, compound, or complex, wherein the polymer or oligomer is prepared from the reaction of a tetrahydrophthalic anhydride with at least one of a diol, a hydroxy compound, or a polyhydroxy compound, and
xv) a polymer or oligomer having at least one cyclohexene group, and a transition metal salt, compound, or complex, wherein the polymer or oligomer is prepared from the reaction of a tetrahydrobenzyl alcohol with one or more compounds having an ester functionality.

* * * * *

UNITED STATES PATENT AND TRADEMARK OFFICE
CERTIFICATE OF CORRECTION

| | | |
|---|---|---|
| PATENT NO. | : 7,219,362 B2 | Page 1 of 1 |
| APPLICATION NO. | : 10/429364 | |
| DATED | : May 15, 2007 | |
| INVENTOR(S) | : Beckwith et al. | |

It is certified that error appears in the above-identified patent and that said Letters Patent is hereby corrected as shown below:

Column 24, Line 36, "thermoformed formed web" should be --thermoformed web--

Signed and Sealed this

Eighth Day of April, 2008

JON W. DUDAS
*Director of the United States Patent and Trademark Office*